US010685260B1

(12) United States Patent
Adelaar et al.

(10) Patent No.: US 10,685,260 B1
(45) Date of Patent: Jun. 16, 2020

(54) INTERACTIVE MODELING APPLICATION ADAPTED FOR EXECUTION VIA DISTRIBUTED COMPUTER-BASED SYSTEMS

(71) Applicant: Finiti Research Limited, Dublin (IE)

(72) Inventors: Jesse David Adelaar, New York, NY (US); Werner Janjic, Ludwigshafen am Rhein (DE); Christoph Giess, Frankenthal (DE)

(73) Assignee: Finiti Research Limited, Dublin (IE)

( * ) Notice: Subject to any disclaimer, the term of this patent is extended or adjusted under 35 U.S.C. 154(b) by 0 days.

(21) Appl. No.: 16/434,092

(22) Filed: Jun. 6, 2019

(51) Int. Cl.
*G06N 20/00* (2019.01)
*G06K 9/62* (2006.01)
*G06F 16/951* (2019.01)
*G06F 9/50* (2006.01)

(52) U.S. Cl.
CPC ......... *G06K 9/6257* (2013.01); *G06F 9/5072* (2013.01); *G06F 16/951* (2019.01); *G06N 20/00* (2019.01)

(58) Field of Classification Search
CPC .... G06K 9/6257; G06N 20/00; G06F 16/951; G06F 9/5072
See application file for complete search history.

(56) References Cited

U.S. PATENT DOCUMENTS

| 6,760,631 B1 | 7/2004 | Berkowitz et al. |
| 8,285,523 B2 | 10/2012 | Mandal et al. |
| 9,135,559 B1 * | 9/2015 | Chan ............... G06F 16/248 |
| 9,461,876 B2 | 10/2016 | Van Dusen et al. |
| 10,192,172 B2 * | 1/2019 | Chan ............... G06F 16/248 |
| 10,496,927 B2 * | 12/2019 | Achin ............... G06N 5/04 |
| 2011/0060441 A1 | 3/2011 | Ko et al. |
| 2011/0145185 A1 | 6/2011 | Wang et al. |
| 2012/0084235 A1 | 4/2012 | Suzuki et al. |
| 2012/0215751 A1 | 8/2012 | Broil et al. |

(Continued)

OTHER PUBLICATIONS

Abadi et al. "TensorFlow: Large-Scale Machine Learning on Heterogeneous Distributed Systems", Nov. 9, 2015, Google Al, pp. 1-19. (Year: 2015).*

(Continued)

*Primary Examiner* — Kamran Afshar
*Assistant Examiner* — Ying Yu Chen
(74) *Attorney, Agent, or Firm* — Knobbe, Martens, Olson & Bear LLP

(57) ABSTRACT

Systems and methods are disclosed that enable distributed execution of prediction models by disparate, remote systems. Prediction model code is transmitted to the disparate, distributed systems for execution by the disparate, remote systems. Default model input data may be independently modified by a given system, and the modified input data may be used when the given system executes the model. Model predictions and associated model parameters are received from the disparate, distributed systems. The accuracy of the received model predictions from the disparate, distributed systems are analyzed. Based on the analyzed accuracy of the received model predictions, a determination is made as to which model predictions satisfy at least a first criterion. Computer-based resources are allocated using the determination as to which model predictions satisfy at least the first criterion.

30 Claims, 19 Drawing Sheets

(56) References Cited

U.S. PATENT DOCUMENTS

| | | | | |
|---|---|---|---|---|
| 2013/0290223 | A1* | 10/2013 | Chapelle | G06N 20/00 |
| | | | | 706/12 |
| 2014/0372173 | A1 | 12/2014 | Koganti | |
| 2015/0287142 | A1 | 10/2015 | Brown | |
| 2015/0317670 | A1* | 11/2015 | Cavander | G06Q 30/0242 |
| | | | | 705/14.41 |
| 2016/0110657 | A1* | 4/2016 | Gibiansky | G06N 20/00 |
| | | | | 706/12 |
| 2018/0300653 | A1* | 10/2018 | Srinivasan | H04L 67/322 |
| 2019/0130313 | A1* | 5/2019 | Patavardhan | G06N 20/00 |
| 2019/0156243 | A1* | 5/2019 | Li | G06F 17/28 |
| 2019/0378050 | A1* | 12/2019 | Edkin | G06Q 30/0185 |

OTHER PUBLICATIONS

Mellers et al. "Identifying and Cultivating Superforecasters as a Method of Improving Probabilistic Predictions," Perspectives on psychological Science, 2015, pp. 267-281, vol. 10(3).

* cited by examiner

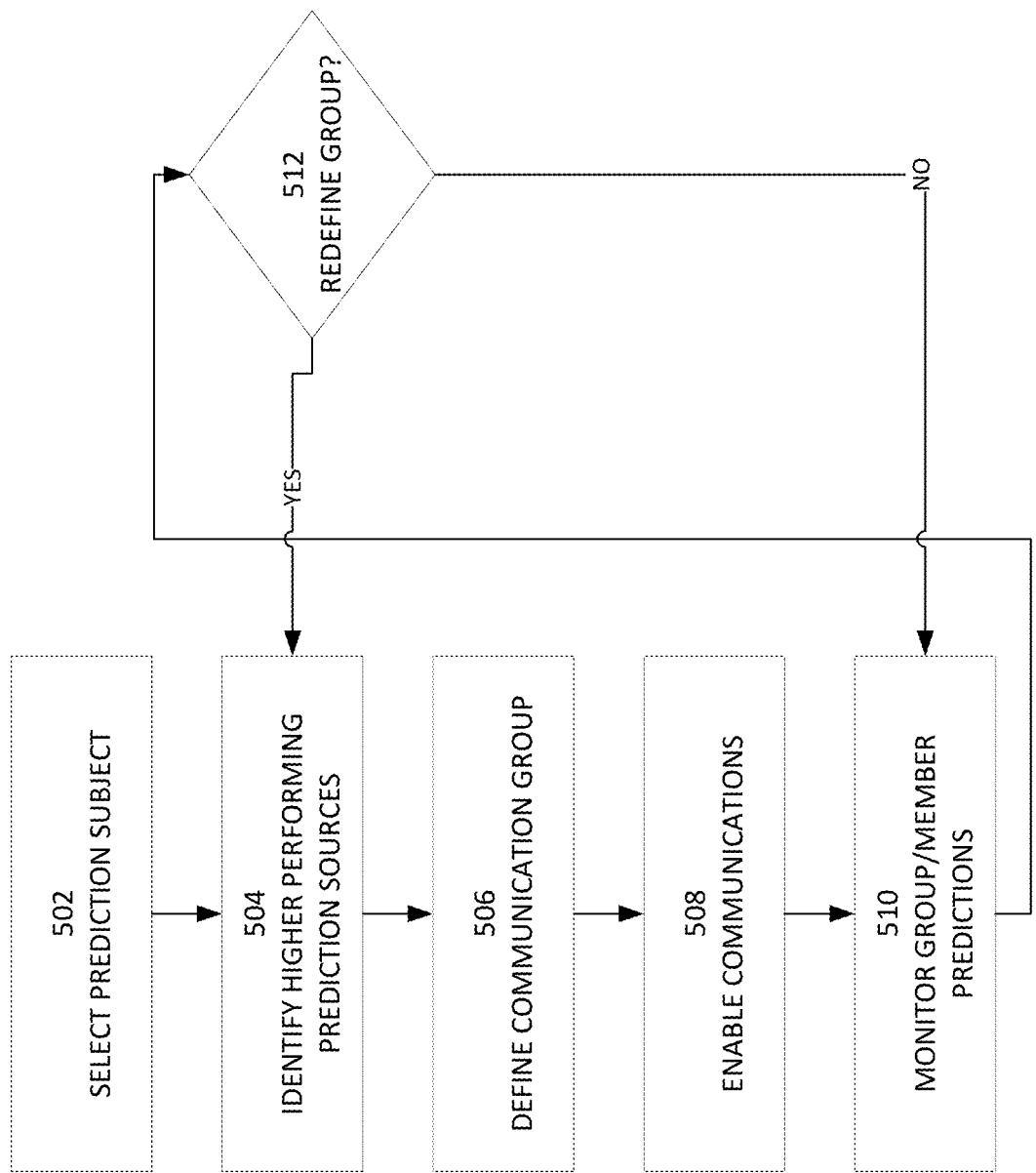

FIG. 6I

INTERACTIVE MODELING APPLICATION ADAPTED FOR EXECUTION VIA DISTRIBUTED COMPUTER-BASED SYSTEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This document relates to systems and techniques for distributed execution of code and for allocating computer resources.

Description of the Related Art

Modeling systems are increasingly used to perform predictions so as to pursue productive avenues of experimentation, prepare for certain events, and determine medical treatments, by way of example. For example, modeling systems are used to predict the weather, chemical reactions, clinical treatments, and the like. However, the execution of such models consumes large amounts of processing power and memory, providing heavy loading on centralized computer resources. Further, such models require large amounts of data from multiple sources, which can heavily load data networks used to access the data.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example aspect of the present disclosure, systems and methods enable distributed execution of prediction models by disparate, remote systems. Prediction model code is transmitted to the disparate, distributed systems for execution by the disparate, remote systems. Default model input data may be independently modified by a given system, and the modified input data may be used when the given system executes the model. Model predictions and associated model parameters are received from the disparate, distributed systems. The accuracy of the received model predictions from the disparate, distributed systems are analyzed. Based on the analyzed accuracy of the received model predictions, a determination is made as to which model predictions satisfy at least a first criterion. Computer-based resources are allocated using the determination as to which model predictions satisfy at least the first criterion.

An aspect of the present disclosure relates to a system, comprising: a processing device; a network interface; and a computer readable medium that stores programmatic instructions that, when executed by the processing device, are configured to cause the system to perform operations comprising: transmit, using the network interface, to disparate, distributed systems, prediction model program code configured to be executed by the disparate, distributed systems; transmit default model input data to the disparate, distributed systems; enable default model input data to be independently modified using a given system of the disparate, distributed systems; receive model predictions and associated model parameters from at least a portion of the disparate, distributed systems, wherein at least a portion of the model predictions are generated using modified default model input data; analyze an accuracy of the received model predictions from disparate, distributed systems; determine, using the analyzed accuracy of the received model predictions from disparate, distributed systems, which model predictions satisfy at least a first criterion; and allocate at least a first resource based at least in part on the determination as to which model predictions satisfy at least the first criterion.

An aspect of the present disclosure relates to non-transitory computer readable medium that stores programmatic instructions that, when executed by a processing device, are configured to cause the processing device to perform operations comprising: transmit, using a network interface, to a plurality of remote systems, prediction model program code configured to be respectively executed by the plurality of systems; transmit default model input data to the plurality of remote systems; enable default model input data to be independently modified using a given system of the plurality of remote systems; receive model predictions from at least a portion of the plurality of remote systems, wherein at least a portion of the model predictions are generated using modified default model input data; analyze the received model predictions from a plurality of remote systems; determine, using the analyzed received model predictions from the plurality of remote systems, which model predictions satisfy at least a first criterion; and allocate at least a first resource based at least in part on the determination as to which model predictions satisfy at least the first criterion.

An aspect of the present disclosure relates to a computer implemented method, the method comprising: providing access to, using a network interface, to a plurality of remote systems, to a predictive model; providing access to default model input data to the plurality of remote systems; enabling default model input data to be independently modified using a given system of the plurality of remote systems; receiving a plurality of different model predictions, wherein a first model prediction is generated using a first modification of a first item of default model input data made using a first of the remote systems, and a second model prediction is generated using a second modification of the first item of default model input data made using a second of the remote systems; analyzing the received model predictions, including at least the first model prediction generated using the first modification of the first item of default model input data made using the first of the remote systems, and the second model prediction generated using the second modification of the first item of default model input data made using the second of the remote systems; determining, using the analyzed received model predictions, which model predictions satisfy at least a first criterion; and allocating at least a first resource based at least in part on the determination as to which model predictions satisfy at least the first criterion.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

FIGS. 2-5 illustrate example processes.

FIGS. 6A-6J illustrate example user interfaces.

DETAILED DESCRIPTION

Figure 1A:
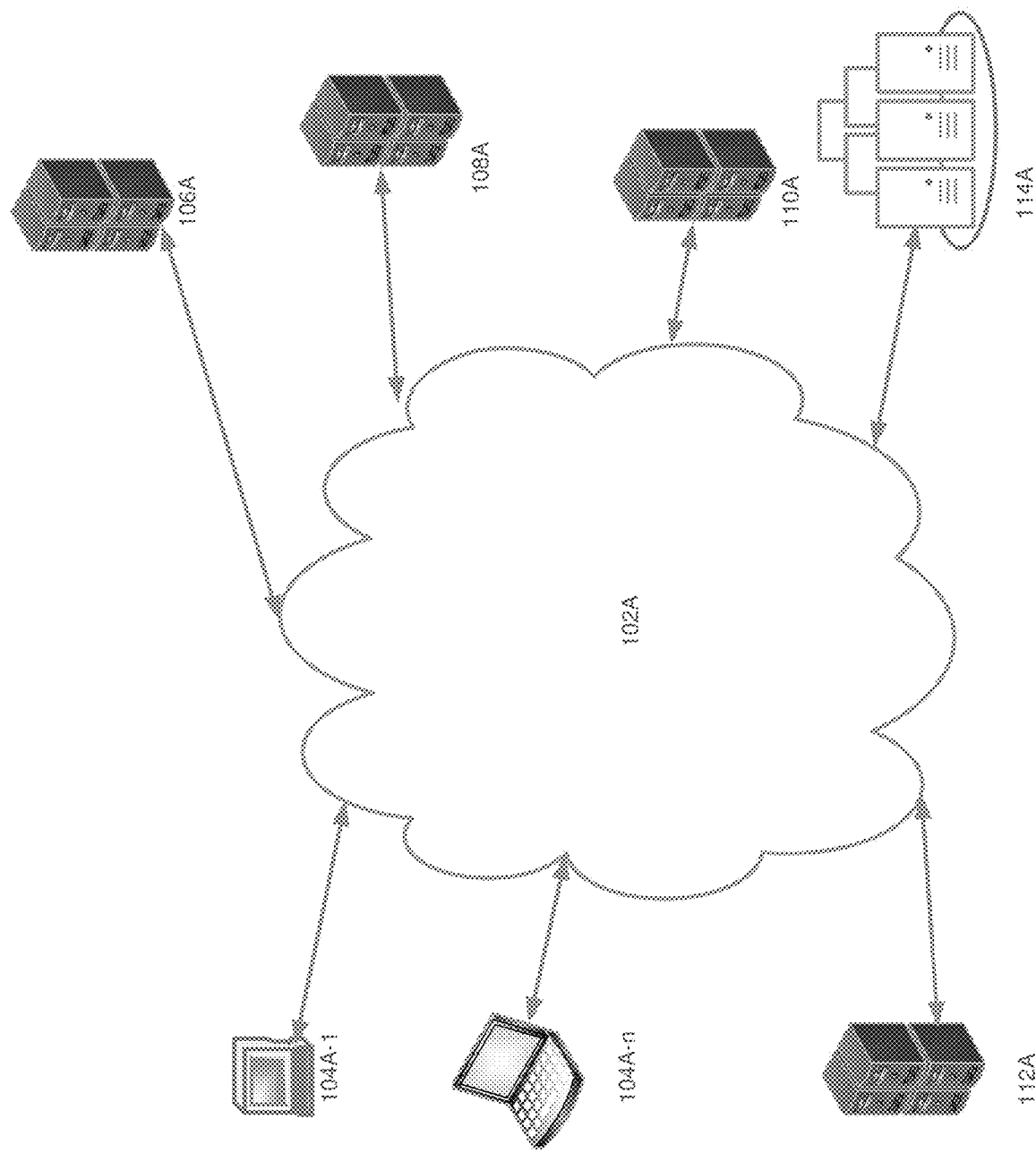
FIGS. 1A-1D illustrate example architectures and operating environments.

As similarly discussed above, modeling systems may be used to perform predictions so as to pursue productive avenues of experimentation, prepare for certain event, and determine medical treatments, by way of example. For example, modeling systems are used to predict the weather, chemical reactions, clinical treatments, and the like. To efficiently and effectively perform such modeling certain technical challenges need to be overcome that conventional systems have failed to adequately address. For example, the execution of such models consumes large amounts of processing power and memory, providing heavy loading on centralized computer resources. Further, such models require large amounts of data from multiple sources, which can heavily load data networks used to access the data. Still further, often models are ineffective in providing accurate predictions. Yet, such poor performing models are often not efficiently identified, and so computer resources are unnecessarily wasted executing such models.

Systems and methods are described that overcome some or all of the foregoing technical challenges. As will be described, prediction models may be executed by disparate computing devices that communicate over a network with a model performance evaluation and prediction aggregation system. Advantageously, crowd sourced predictions generated by a select set of users (using and/or defining models and/or modifying model inputs and assumption) may provide better and more accurate forecasts than the general population or then even than a population of individuals that are highly educated and trained in the relevant field but that are simply not capable of generating accurate predictions.

As well also be described, certain prediction sources may be identified as being higher performing prediction sources (e.g., based on the accuracy, repeatability, and/or ranking of their predictions). Certain additional computer resources may be provided to such identified higher performing prediction sources. For example, such predictions sources may be assigned to a communication group and enabled to communicate data or information with other group members. Such communications may further enhance the accuracy of the predictions. Optionally, such discussions may be monitored and/or moderated. A given communication group may, for example, exchange information regarding individual forecasts, and the quantitative and qualitative factors that underlie such forecasts. A given communication group may generate a group consensus forecast.

The model performance evaluation and prediction aggregation system may comprise a hosted computing environment that includes a collection of physical computing resources that may be remotely accessible and may be rapidly provisioned as needed (sometimes referred to as a "cloud" computing environment). The model performance evaluation and prediction aggregation system may also include a secure data store. The secure data store is optionally a hosted storage environment that includes a collection of physical data storage devices that may be remotely accessible and may be rapidly provisioned as needed (sometimes referred to as "cloud" storage).

The model performance evaluation and prediction aggregation system may periodically compare the predictions of the models being executed by the disparate systems (e.g., different types of computer systems, such as mobile devices, desktop computers, etc.) against actual results and occurrences. The predictions may be quantitative in nature (e.g., a numerical value) or a prediction may be related to a classification.

Another technical challenge is how metrics should be selected and implemented that accurately measure how well each model achieves respective model goals. Metrics, which may be seem sensible, may actually provide misleading evaluations.

For example, if an event only occurs 1% of the time, a model which always predicts that the event will never happen will still have an accuracy of 99% and so may appear to provide accurate predictions.

Thus, it is desirable to identify models have reproducible, consistent predictive ability over time and utilizing different data sets. Different evaluation criteria may optionally be used depending on the type of model or goal.

For example, a model may be intended to address a regression problem, such as the prediction of a stock or financial performance of an entity. Some or all of the following metrics may be used to evaluate a model addressing a regression problem:

R-squared: a statistical measure that indicates the proportion of the variance for a dependent variable that's explained by an independent variable or variables in a regression model (to what extent the variance of one variable explains the variance of the second variable). R-squared may be used to indicate how many variables compared to the total variables the model predicted. A high performing model may have a low R-squared value, and a low performing model (that does not fit the data well) may have a high R-squared value.

Average error: the difference between the predicted numerical value and the actual numerical value.

Median error: the average of all differences between predicted values and actual values.

Mean Square Error: measures the average of the squares of the errors or deviations (the difference between the estimator and what is estimated). Mean Square Error may be utilized to identify outliers.

Mean absolute error: mean of the absolute errors (the average of the absolute differences between prediction and actual observation—where all individual differences have equal weight, and where large outliers can impact the final evaluation of the model).

If, on the other hand, a model being evaluated is a classification model (used to predict what category a subject falls into), different metrics may be used. An example of a classification problem is analyzing characteristics of a user to determine if the user is likely to be good at analyzing certain types of data or is likely to be bad at analyzing certain types of data.

Some or all of the following metrics may be used to evaluate a model addressing a classification problem:

AUC (Area Under The Curve)-ROC (Receiver Operating Characteristics) curve (AUC-ROC): a performance measurement for classification problem at different thresholds, where ROC is a probability curve and AUC represents degree or measure of separability.

Percent correct classification (PCC): measures overall accuracy without regard to what kind of errors are made; every error has the same weight.

Confusion matrix: also measures accuracy but can distinguish between different errors and provide summary different kinds of errors (Type I and Type II errors), such as precision and recall, false alarms and false dismissals, or specificity and sensitivity.

The PCC metric and the confusion matrix metric are particularly useful when scoring and acting on an entire population (e.g., scoring each predictor providing a prediction each time a prediction is made).

The following metrics may be particularly useful when only results connected to a subset of data needs to be acted on:

Lift and Gain charts: the charts measure the effectiveness of a model by calculating the ratio between the results obtained with and without the predictive model (indicating if using predictive models has a positive effect or not).

As will be described in greater detail herein, prediction sources (e.g., models operating on certain inputs/assumptions which may be user-adjusted) that are lower performing or inadequately performing for at least a certain amount of time or for a certain number of predictions may be denied access to certain computer resources to thereby reduce unproductive utilization of such computer resources and to reduce computer resource loading. For example, such prediction sources may be prevented from submitting predictions to the model performance evaluation and prediction aggregation system, thereby reducing the network resources, memory resources, computing resources, and program resources that would be expended on such low performing predictions. Optionally, current system loading (e.g., network, memory, and/or processor utilization) may be evaluated and taken into account in determining which prediction resources are to be denied access to computer resources. For example, if the current computer resource utilization is below a certain threshold, certain low performing prediction sources may be provided access to computer resources that would otherwise be denied if the current computer resource utilization is above a certain threshold.

Optionally, in order to reduce loading on the model performance evaluation and prediction aggregation system, the models may be executed by distributed remote systems. For example, models may be executed as JavaScript via browsers on user systems.

Certain examples will now be described with respect to the figures.

Referring to FIG. 1A, the model performance evaluation and prediction aggregation system 114A may comprise a hosted computing environment that includes a collection of physical computing resources that may be remotely accessible and may be rapidly provisioned as needed (sometimes referred to as a "cloud" computing environment). The model performance evaluation and prediction aggregation system 114A may also include a data store. The data store is optionally a hosted storage environment that includes a collection of physical data storage devices that may be remotely accessible and may be rapidly provisioned as needed (sometimes referred to as "cloud" storage).

A plurality of user systems/prediction sources 104A-1 . . . 104A-N may include standalone computers (e.g., desktop, laptop, tablet, smart phone, or other computer device), a centralized computer system, or a cloud computing system. The user systems 104A-1 . . . 104A-N may be associated with users that generate and/or modify software models, such as those described herein. The user systems may also be configured to share models and/or model assumptions (e.g., user specified/modified model inputs), provide model predictions/forecasts, access and view model predictions and forecasts, compare model results, and to communicate with other users of the model performance evaluation and prediction aggregation system 114A.

Of course a given user may both participate in the generation of predictions models and in the viewing of model predictions. The prediction models may be used by the user systems 104A-1 . . . 104A-N (e.g., by browsers executing model script) and/or by the performance evaluation and prediction aggregation system 114A.

Processes described herein may be performed in whole or in part using the model performance evaluation and prediction aggregation system 114A and one or more of the user systems 104A-1 . . . 104A-N.

The model performance evaluation and prediction aggregation system 114A and/or the user systems 104A-1 . . . 104A-N may communicate with systems 106A, 108A, and/or 110A. For example, the prediction aggregation system 114A and/or the user systems 104A-1 . . . 104A-N may request and access data sets from system 106A, where the data sets may be used by models in generating predictions. The system 108A may provide metrics criteria used to evaluate model performance. System 110A may provide actual data which may be compared with predicted data to thereby determine model performance (including model assumptions) using the metrics criteria.

It is understood that each of systems 106A, 108A, and/or 110A may include multiple systems operated by different entities. For example, data sets may be accessed from systems associated with government regulatory agencies, universities, companies, and/or the like. It is also understood that systems 106A, 108A, and/or 110A may be included as part of the model performance evaluation and prediction aggregation system 114A. The topology may be dynamically adjusted and reconfigured according to where needed or desirable historical data sets, metrics, or current data (e.g., real time data, 15 minutes or less old) resides and/or based on computer resource loading (e.g., processor, memory, network, or software application loading).

The various systems and user systems illustrated in FIG. 1A may communicate over one or more wired and/or wireless networks 102A. For example, the network(s) 102A may include a cellular network, a WiFi network, the Internet, an intranet, and/or other networks.

Figure 1B:
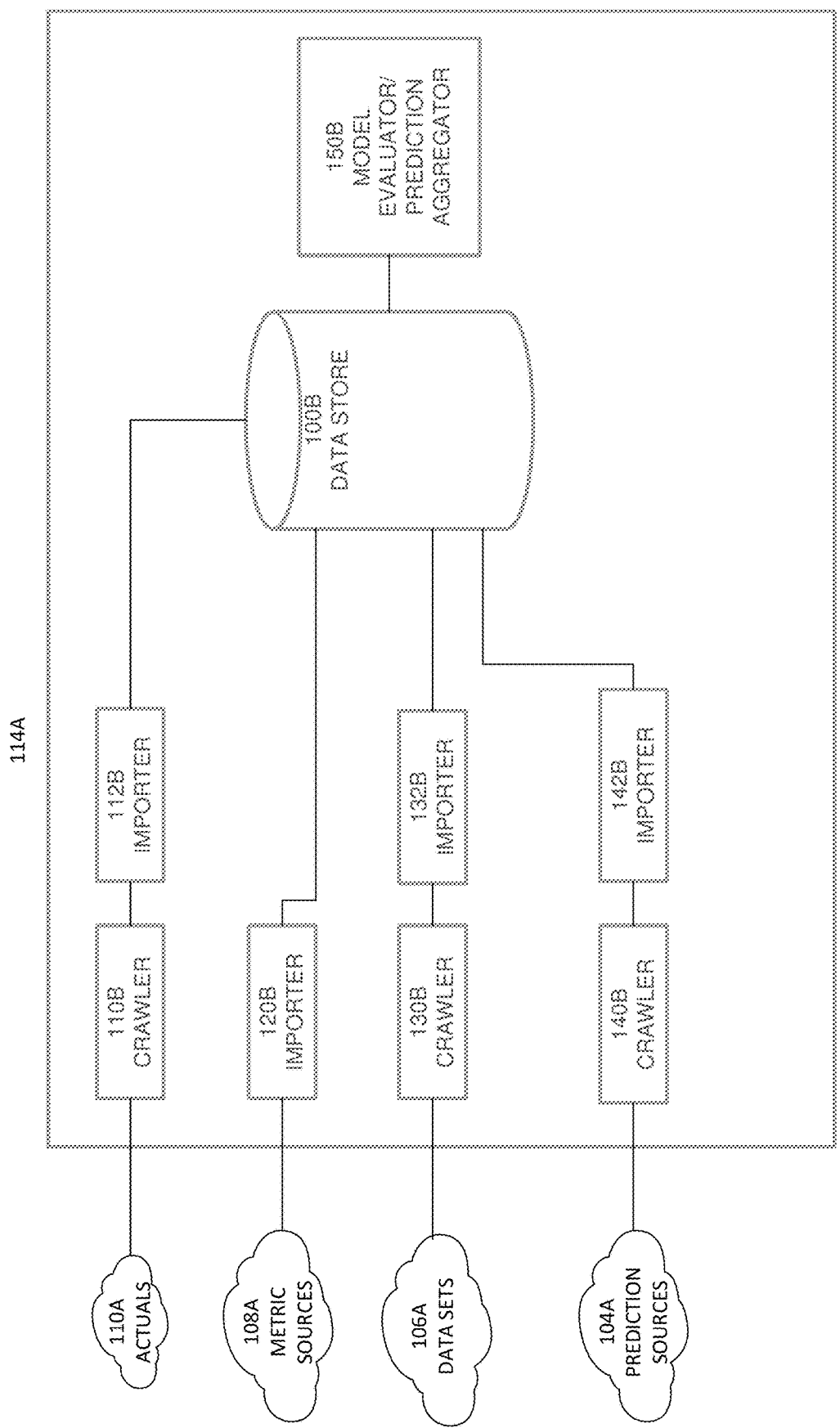

FIG. 1B illustrates a model performance evaluation and prediction aggregation system 114A and environment in greater detail. The model performance evaluation and prediction aggregation system 114A includes some or all of the following features. A crawler module 110B crawls various sources of actual data, such as one or more systems 110A that may be associated with reporting services, news services, or other services. The crawler module 110B may access location data of data sources (e.g., URLs) and crawl schedules. The crawler module 110B may crawl the data sources accordingly, retrieving and optionally indexing the desired data. The crawl loading may be distributed among different computer systems running instantiations of a crawl application. An importer module 112B may be configured to import various types of data formats (e.g., delimited files, Excel spreadsheets, fixed width files, files of SQL insert statements, etc.) and convert such data into a format for storage in a database hosted by a data store 100B. Optionally, only delta data will be imported (new data that has not already been accessed and stored in the data store 100B).

Similarly, importer module 120B may access one or more metric source systems 108A to access metrics criteria used to evaluate model performance, and to convert such data into a format for storage in a database hosted by the data store 100B.

A crawler module 130B may crawl various sources of data sets, such as one or more systems 106A. As similarly discussed above with respect to crawler module 110B, the crawler module 130B may access location data of data sources and crawl schedules, and may crawl the data sources accordingly, retrieving and optionally indexing the desired data sets. The crawl loading may be distributed among different computer systems running a crawl application. An importer module 132B may be configured to import various types of data set formats (e.g., delimited files, Excel spreadsheets, fixed width files, files of SQL insert statements, etc.) and convert such data sets into a format for storage in a database hosted by a data store 100B.

A crawler module 140B crawls various sources of prediction sources, such as one or more systems 104A. The systems 104A may be user systems, wherein users modify prediction models and/or model assumptions, and wherein the systems 104A optionally execute the models (e.g., via user system browsers). As similarly discussed above with respect to crawler 110B, the crawler 140B may access location data of prediction sources and crawl schedules, and may crawl the prediction sources accordingly, retrieving and optionally indexing the desired predictions. The crawl loading may be distributed among different computer systems running a crawl application. An importer module 142B may be configured to import various types of prediction formats (e.g., delimited files, Excel spreadsheets, fixed width files, files of SQL insert statements, etc.) and convert such data sets into a format for storage in a database hosted by a data store 100B. The predictions may be stored in association with an identifier as to the prediction source (e.g., an identifier associated with the user that modified or executed a given model and/or an identifier associated with the user system), model parameters (e.g., the model inputs/assumptions used to make the predictions), and the date/time the prediction was generated.

A model evaluator and prediction aggregator 150B evaluates prediction models (and optionally users which modified the models or model inputs/assumptions) based on the model predictions stored in the data store 100B. The model evaluator and prediction aggregator 150B may optionally aggregate predictions for a given target from multiple sources to generated an aggregated prediction. In addition, the model evaluator and prediction aggregator 150B may generate communication/collaboration groups to facilitate communication among prediction sources and to enhance prediction accuracy. The model evaluator and prediction aggregator 150B is discussed in greater detail herein.

Figure 1C:
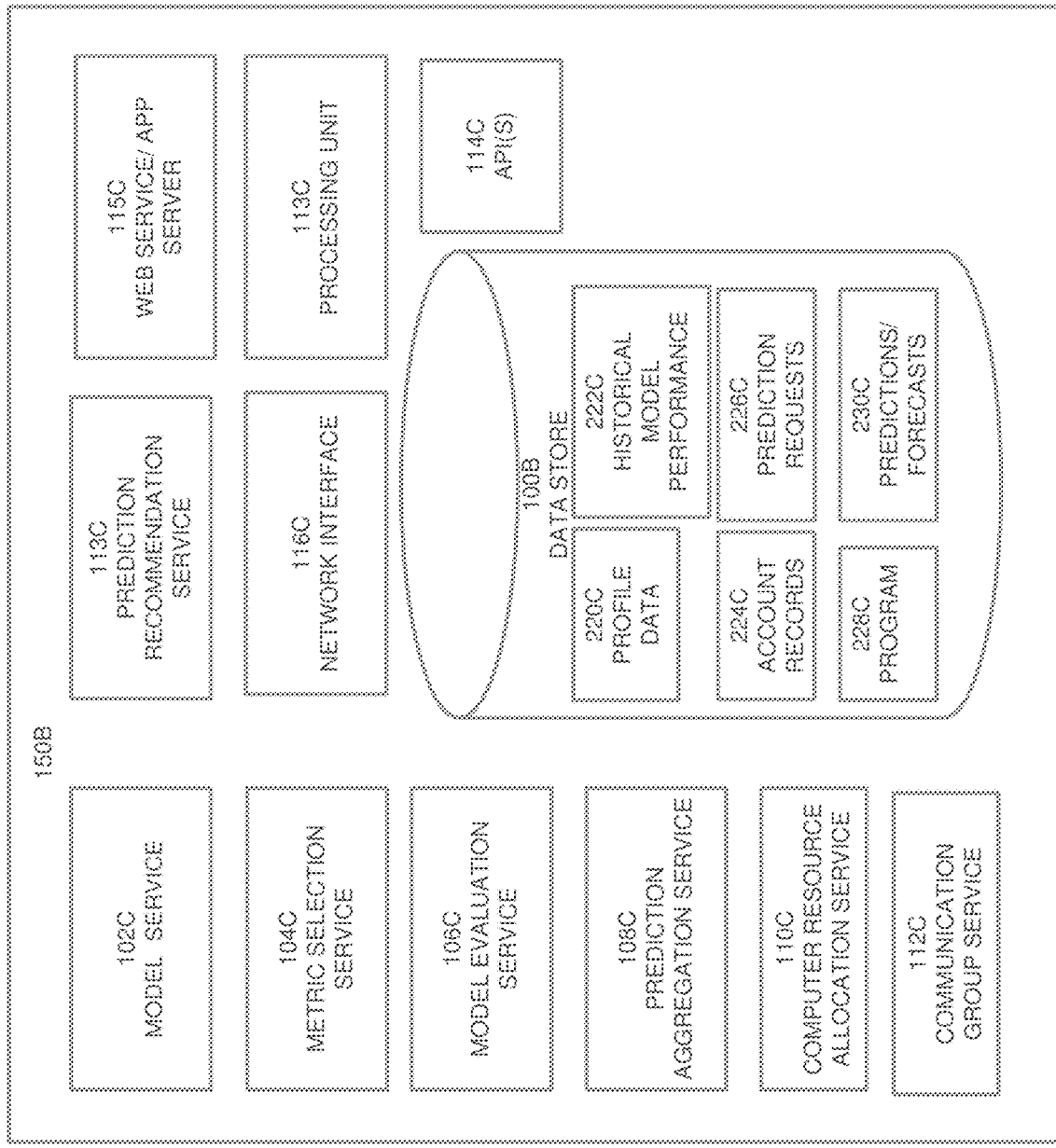

With reference to FIG. 1C, an example model evaluator and prediction aggregator 150B architecture is illustrated. A model service 102C may be configured to service model requests from user systems 104A (which will be used in generating predictions). For example, the model service 102C may receive model requests via the web service 115C, and access corresponding model code from a model code database 232C hosted by the data store 100B. The model code may be configured to be executed by a browser. For example, the model code may be JavaScript or other client-side scripting language that made be loaded to the browser when the browser accesses a webpage via the web service/app server 115C.

A model selection service 104C may be configured to select appropriate metric evaluation criteria (such as those disclosed herein) based on the model type whose performance is being evaluated. A model evaluation service 106C is configured to evaluate a given model output from a prediction source using the select appropriate metric evaluation criteria. The evaluation results (which may be a numerical score, a letter score, or other performance indicator) may be stored in the data store 100B in a historical model performance database 222C in association with an identifier associated with the user and/or user system that executed and modified the model or model assumptions, model parameters (e.g., the model inputs/assumptions used to make the predictions), and the date/time the prediction was generated. For example, the model evaluation service 106C may use a score on a scale of 0.0 to 0.5, where 0.5 is the worst score (e.g., comparable to a random prediction) and 0.0 is the best score (a perfect prediction). Optionally, in addition or instead a score may be generated based on multiple predictions over time from a given prediction source (e.g., an average, median, or other central tendency of prediction scores since inception or for a specified period of time). Optionally, more recent predictions may be weighted by the model evaluation service 106C more heavily than older predictions so that the more recent predictions from the prediction system (which are more indicative of the current accuracy of predictions from the system) will play a bigger part in generating the prediction accuracy score.

A prediction aggregation service 108C may aggregate predictions received from models respectively executed by different prediction sources (e.g., systems 104A), where different systems may execute different versions of models and/or models that utilize different assumptions/inputs, to generate an aggregated score. For example, the prediction aggregation service 108C may utilize one or more statistical functions (e.g., a central tendency) to calculate an aggregated prediction value. For example, the central tendency may be calculated using one or more of the following functions:

average;
median;
mode (the most frequent bid amount in the set of winning bids);
geometric mean (the nth root of the product of n data values);
harmonic mean (the reciprocal of the arithmetic mean of the reciprocals of the data values);
quadratic mean or root mean square (RMS) (the square root of the arithmetic mean of the squares of the data values);
generalized mean (the nth root of the arithmetic mean of the nth powers of the bid amounts);
weighted mean (an arithmetic mean that incorporates weighting to certain data elements);
truncated mean (the arithmetic mean of data values after a selected number or proportion of the highest and lowest bid amount data values have been discarded);
midrange (the arithmetic mean of the highest and lowest values of the bid amounts or distribution);
Winsorized mean (the arithmetic mean of bid amount values after a selected number or proportion of the highest and lowest bid amount data values have been set equal to the largest and smallest bid amount values that remain);
exponential mean;
trimean (calculated by adding twice the sum of the mean to the sum of the 25th percentile and 75th percentile and then divide the sum by four);

trimedian (calculated by adding twice the sum of the median to the sum of the 25th percentile and 75th percentile and then divide the sum by four); or normalized mean.

Optionally, to perform such aggregation more efficiently and to reduce peak loading on the processing unit 113C and other system resources, rather than wait for all the predictions to be received from the various distributed prediction systems, aggregation values may be calculated for two more subsets of prediction values received from the distributed prediction systems. The subset aggregation values may then be aggregated by the prediction aggregation service 108C to produce a final aggregate value.

A computer resource allocation service 110C may be configured to allocate computer resources to prediction sources (e.g., prediction systems 104) based at least in part on the evaluation results of the model evaluation service 106C (e.g., a prediction accuracy score). Optionally, current system loading (e.g., network, memory, and/or processor utilization) may be evaluated and taken into account in allocated computer resources.

For example, prediction sources (or users thereof) that have a current score below a certain threshold may be prevented from accessing certain network, processor, memory, and/or software resources. By way of illustration, the computer resource allocation service 110C may be configured to prevent prediction sources (or users thereof) that have a current score below a certain threshold from submitting predictions to the model performance evaluation and prediction aggregation system 114A, thereby reducing the network resources, memory resources, and computing resources that would be expended on such low performing predictions, and freeing up such resources for other uses and applications.

A communication group service 112C may be configured to assign predictions sources having higher than a corresponding threshold score to a communication group and enable members of the communication group to communicate data or information with other group members (e.g., communicate model assumption/input recommendations, analysis of past prediction results, individual forecasts and the quantitative and qualitative factors that underlie such forecasts, and/or the like). Such communications may further advantageously enhance the accuracy of the predictions. Optionally, such communications may be moderated. A given communication group may generate a group consensus forecast which may be stored in the predictions/forecasts database 230C, and which may be evaluated via the model evaluation service 106C.

A prediction recommendation service 113C is configured to analyze a user's profile data 220C, popular or favorite prediction subjects, and/or prediction requests (e.g., from third parties that would like predictions) 226C stored in the data store 100B, and generate recommendations of subjects (e.g., companies) for the user, and use the analysis to generate recommendations for using corresponding prediction models. Such recommendations may result in more accurate forecasts as the recommendations are provided to users who have evidenced a greater likelihood of being able to use models to generate accurate predictions for the corresponding recommended subjects.

One or more Applicant Programming Interfaces (APIs) may be configured to interface to various other systems (e.g., to access news or other data that may be relevant to making predictions).

A network interface 116C may be configured to receive and transmit data over a network to other computer systems and/or storage systems, such as the other systems described herein.

A web service/app server 115C may be utilized to provide web interfaces to other systems described herein, to embed model code, to download applications to user systems (e.g., cell phones, laptops, tablet computers, desktop computers), and/or the like.

The processing unit is configured to execute program instructions (e.g., programs 228C which may be used to execute certain processes described herein).

Profile data 220C, stored in data store 100B may include data regarding a given user received from the user or obtained during user utilization of the system 114A. For example, the profile data 220C may include user interests (e.g., companies the user has added to the user's watch list or indicated as a favorite, industry sectors (e.g., technology, manufacturing, aerospace, defense, agriculture, biosciences, energy, information, financial Services, transportation, etc.) the user has indicated an interest in (e.g., indicated as a favorite), the number of predictions the user has made for a particular company, the user's prediction scores for a given company, etc.

Account records 224C stored in the data store 100B may store name, contact information (e.g., email address, mobile phone number, physical address, etc.), frequency of predictions, prediction accuracy indicator(s) (e.g., scores) for the user, invitations transmitted to the user to provide predictions, acceptances of such invitation by the user, and/or communication groups of which the user is a member.

Predictions/forecasts 230C from prediction sources may be stored in the data store 100B in association with a subject identifier, the prediction source, and a date/time the prediction was made.

Figure 1D:
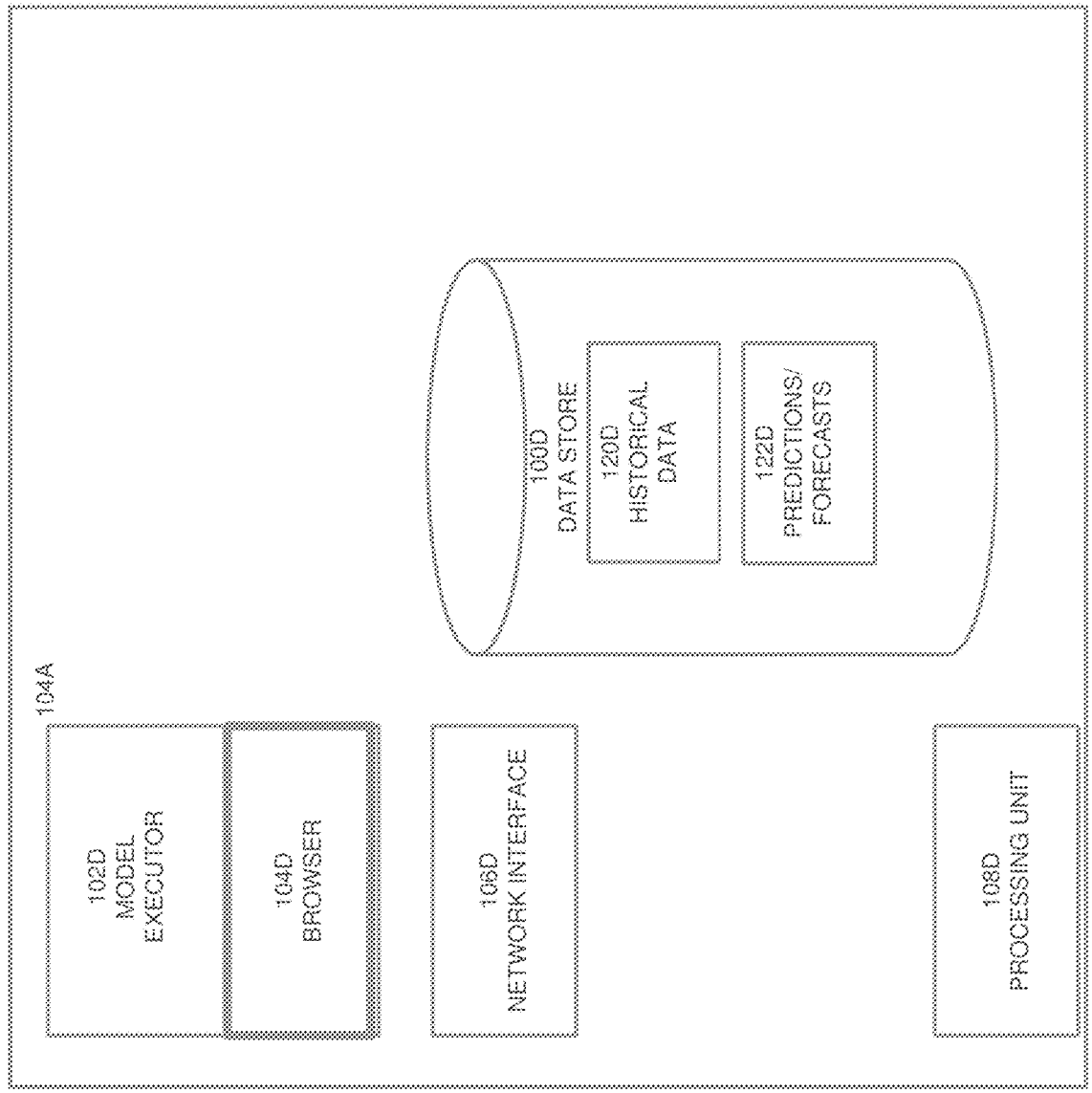

FIG. 1D illustrates an example user system/prediction source 104A. The example system 104A includes a browser 104D and model execution module 102D (e.g., configured to execute client-side script for a prediction model provided to the browser 102 from system 114A). A network interface 108 is provided to receive data, programs, and/or other information from systems and data sources described herein and to transmit data, instructions, and the like. A processing unit 108D (e.g., a microprocessor) is configured to execute program instructions, such as client-side code received by the browser 102D. A data store 100D is configured to store historical data 120D for one or more subjects that may be used in generating predictions and/or in comparing predictions to corresponding predicted data. Predictions/forecasts 122D made using the system (or made by other systems having a common user) may also be stored in the data store 100D.

Figure 2:

FIG. 2 illustrates an example process. At block 202, a document (e.g., a webpage) is served to a user system in a client-server architecture. The document may include a user interface via which a user may request data sets from a remote system (e.g., one or more of the systems disclosed herein). For example, with respect to financial predictions regarding a company, the data may include some or all of the following: revenue growth, EMT margins, depreciation growth, EV/EBITDA, and/or stock price. By way of further example, for predictions regarding a chemical reaction, the data sets may include some or all of the following: catalyst(s), solvent(s), reagent(s), and/or temperature. Such data sets may be useful in setting certain model inputs or assumptions. At block 206, the remote system enables the data set to be provided to the user system.

At block 208, a watch list modification is provided by the user system and received by a remote system (e.g., system 114A). The modification may be the addition of a new subject or the deletion of an existing subject from a watch list. The remote system 114A is configured to provide the user system with periodic and/or real time updates regarding data sets for subjects on the watch list. At block 210, the watch list update is synchronized with the watch list for the user stored by the remote system. If the user is utilizing multiple systems to execute models and generate predictions, the watch list may be synchronized to the other user systems. Such synchronization may be performed in real time across devices that are associated with the user's authentication data (e.g., password, user identifier, etc.) so that when the user utilizes a given device, the user may be presented with the current watch list.

At block 210, a request is received at the remote system to generate a comparison of the predictions of two or more models (e.g., models with different inputs/assumptions). At block 212, a user interface comprising textual and/or graphical comparisons of model outputs is enabled to be rendered.

Figure 3:

FIG. 3 illustrates am example process for generating invitations to generate predictions for one or more subjects. At block 302, a prediction request is received for a given subject (e.g., a request for a prediction regarding a company's revenue growth, EBIT margins, depreciation growth, EV/EBITDA, and/or stock price). At block 304, profiles of potential users are accessed. For example, as described elsewhere herein, a profile may include user interests (e.g., companies the user has added to the user's watch list or indicated as a favorite, industry sectors (e.g., technology, manufacturing, aerospace, defense, agriculture, biosciences, energy, information, financial Services, transportation, etc.)) the user has indicated an interest in, the number of predictions the user has made for a particular company, the user's prediction scores for a given company or companies in a given sector. At block 306, one or more users are selected using the profiles. For example, a user may be scored using some or all of the foregoing factors, where different factors may be weighted differently to reflect the importance of the factor as a predictor in how well the user will be able to modify models or specify inputs/assumptions so as to generate relatively accurate predictions for the subject(s) at issue. Users having a score greater than a specified threshold may be selected.

At block 308, electronic invitations to provide predictions regarding the subject are transmitted over a network (e.g., via SMS, email, web page, or otherwise) to the selected users. At block 310, invitation acceptances from some or all of the selected users are received over the network and acceptance indications are stored in association with the user profile/account. At block 312, the users whose invitations acceptances were received are provided with access to prediction models for the subject and to tools for modifying the models and/or specifying inputs/assumptions for the models to thereby generate customized predictions.

Figure 4:
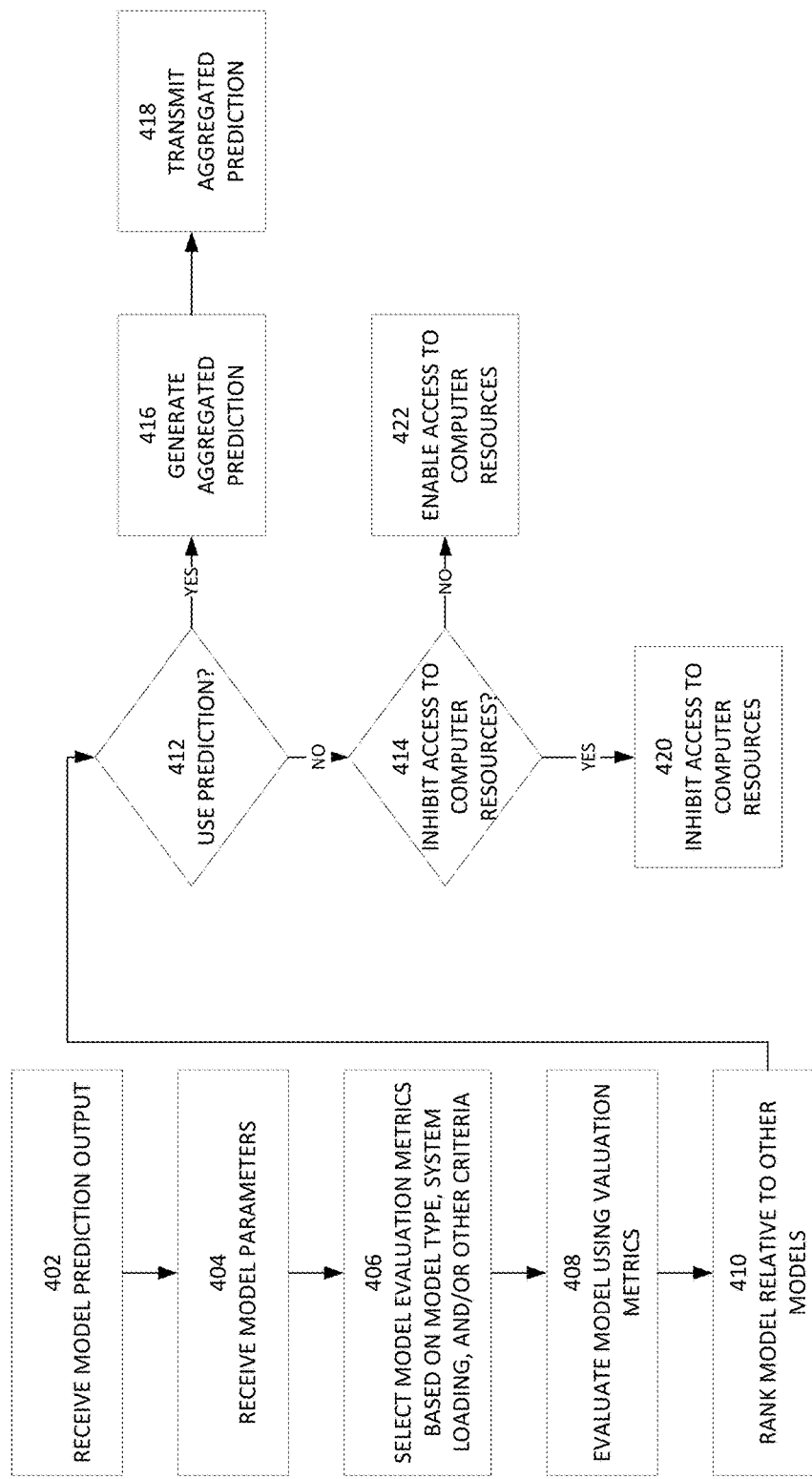

FIG. 4 illustrates an example prediction evaluation and computer resource allocation process. At block 402, a predictor model output is received over a network from a user system. As similarly discussed elsewhere herein, the prediction may be made using a model, where a user has modified the model and/or specified certain model inputs/assumptions. At block 404, model parameters are received for the model from the user system (e.g., default model inputs, user specified inputs/assumptions, etc.). Optionally, the model, model parameters, and prediction values (and date/time thereof) may be stored in association with a user identifier and may be later used in generating a graph showing the change in prediction accuracy and/or predicted values for various versions of the modifications to the model or model inputs/assumptions made by the user. Optionally, user specified inputs/assumptions (e.g., modified default input data) may be synchronized in real time across devices that are associated with the user's authentication data (e.g., password, user identifier, etc.) so that when the user utilizes a given device, the user may be provided with access to the most recent user specified inputs/assumptions on each user device.

At block 406, model evaluation metrics are selected. For example, as discussed elsewhere herein, certain models may be configured to address a regression problem, and certain models may be configured to address a classification problem, where different evaluation metrics may be used for the different model types.

At block 408, the model (including any modification or user specified inputs/assumptions) is evaluated based on the accuracy of the model predictions as similarly discussed elsewhere herein. For example, a model score may be generated. At block 410, the model accuracy may be ranked relative to the performance of other models of other users. For example, the ranking may be based in whole or in part on the scores assigned to the models.

At block 412, a determination is made as to whether the prediction from the user is to be used for one or more purposes (e.g., to be provided by a third party that requested the prediction, to be included in an aggregated prediction with the predictions of other models, etc.). The determination may be made using the model score (e.g., whether the model score is above a specified threshold) and/or based on the model ranking (e.g., whether the model is ranked within a top number of models, such as within the top 10 models). If, at block 412, a determination is made that the prediction is to be used, then at block 416, the model prediction is used (e.g., included in an aggregated prediction). At block 418, the aggregated prediction is provided to one or more designated destinations (e.g., to the prediction requester, to the user, to a data store, or other destination).

If, at block 412, a determination is made that the prediction is not to be used, then at block 414, a determination is made as to whether the user or model is to be granted or denied access to certain computer resources, such as network resources, memory resources, computing resources, and/or program resources. The determination may be made using the model score (e.g., whether the model score is above a specified threshold) and/or based on the model ranking (e.g., is the model is ranked within a top number of models). If, at block 414, a determination is made that the user or model is to be granted access to certain computer resources, then at block 422, the process enables access to such computer resources.

If, at block 414, a determination is made that the user or model is not to be granted access to certain computer resources, then at block 420, the process inhibits access to such computer resources.

FIG. 5 illustrates an example process for defining communication groups. At block 502, a prediction subject is selected. For example, the subject may related to a prediction regarding a company's revenue growth, EMT margins, depreciation growth, EV/EBITDA, and/or stock price. At block 504, higher performing prediction sources may be identified. For example, the higher performing prediction sources may be identified by a ranking of respective users' prediction performances over time with respect to multiple predictions generated using prediction models modified by the users or for which the users specified certain inputs/ assumptions. For example, the ranking may be performed using scores generated for users as similarly discussed elsewhere herein.

At block 506, a communication group may defined to include a threshold number of top performing prediction sources (e.g., the top 10 users, the top 15% of users, etc.). A notification may be generated and sent to the users informing the users of the group and optionally identifying members of the group (e.g., by name or alias). At block 508, communications among group members are enabled (e.g., via an dedicated application, via SMS, email, blog, or otherwise) to communicate with each other, as similarly discussed elsewhere herein. At block 510, the individual and aggregated group predictions are monitored and the accuracy of such predictions are compared against the historical accuracy of the group members and the group as a whole.

At block 512, a determination is made as to whether the group is to be redefined (e.g., whether certain users should be removed from the group and/or whether certain users should be added to the group). For example, if the member and/or the group as a whole's prediction performance has gotten worse or not improved, a determination may be made that the group should be redefined. On the other hand, if the member and/or the group as a whole's prediction performance has improved, a determination may be made that the group should not be redefined.

If a determination is made that the group is to be redefined, the process proceeds to block 504, and the process may repeat.

It should be noted that although certain examples provided herein may be discussed with respect to financial or stock predictions, the processes and systems may be applied to other types of predictions, such as chemical reactions, clinical treatments, network utilization, weather, or the like. Techniques disclosed herein may be particularly advantageous in applications where there is not sufficient data to adequately train deep learning engine. For example, deep learning engines perform well where there are finite possible futures and where the deep learning engine may evaluate such possible futures (e.g., playing poker or chess), but perform poorly in applications where there are too many variables and not enough training data.

With respect to financial or stock predictions, multiple model-types may be used to predict various financial aspects for a given company. For example, models may be used in valuing public and private companies. Different models may be used for short term, medium term, and long term forecasting. As discussed herein, the performance of each model of each model source may be evaluated, scored and/or ranked.

Certain financial models may input relevant data in order to generate predictions. For example, a model used to predict stock price for a company may include a data set including some or all of the following data: current revenue growth, EBIT margins (Earnings before Interest and Taxes to net revenue—earned), depreciation growth, target ratio EV/EBITDA, and/or current stock price. The data may be limited to a specific time period (e.g., a specific start date and end date, short term (e.g., 1 year or less), long term (e.g., more than 1 years), etc.). By way of further example, for a chemical reaction prediction, a model used to predict the results of a chemical reaction may include a data set including some or all of the following data: catalyst(s), solvent(s), reagent(s), and/or temperature.

In addition to or instead of predicting a stock value, a given user may be asked to predict future values for the foregoing and/or for other values, such as future revenue growth, future EBIT margins, future depreciation growth, future EV/EBITDA, gross margin, operating margin, EBIT margin, gross profit, operating profit, and/or other key or useful performance indicators. Different models may be used to make each of the foregoing predictions.

Revenue growth illustrates sales increases or decreases over time, thus providing an indication as to how fast a business is expanding or shrinking. Revenue growth may aid investors or other entities identify trends in order to evaluate revenue growth over time.

Compounded annual revenue growth may be calculated as:

Compounded annual revenue growth (from time $t-k$ to $t$, with $t$ and $k$ denoted in years)=(Revenue/Revenue$_{-k}$)^(1/k)-1

The EBIT margin ratio provides a measure of a company's profitability on sales over a specific time period, thereby providing an indication as to a company's future earnings ability.

Depreciation growth indicates depreciation increases or decreases over time (depreciation indicates the allocation of the cost of a tangible asset over its useful life and is used to account for declines in value).

The EV/EBITDA ratio compares a company's Enterprise Value (EV) to its Earnings Before Interest, Taxes, Depreciation & Amortization (EBITDA). The EV/EBITDA ratio may be used as a valuation metric to compare the relative value of different businesses. The EV/EBITDA ratio provides an indication as to how many times EBITDA investors may have to pay to acquire the company.

As noted above, higher performing prediction sources may be identified and assigned to a communications group. In addition, with respect to financial predictions, higher performing prediction sources may be identified and assigned to a portfolio management team. Various teams' performances may be scored and asset allocations/investments may be based at least in part on such scores (e.g., a Grieg score).

Certain prediction source may perform better at making certain types of predictions and worse at other types of predictions. For example, certain prediction sources may perform well at making long term predictions (e.g., greater than 6 months or greater than a year) and poorly at making short term predictions. By way of further example, certain prediction sources may be better at predicting future revenue growth than at future EBIT margins. Different groups may be defined for different types of predictions to ensure that a given group has the higher performing predictions source relevant to the prediction subject.

Certain example user interface will now be described with reference to the figures. Optionally, user inputs provided via some or all of the example user interfaces may be synchronized in real time across devices that are associated with the user's authentication data (e.g., password, user identifier, etc.) so that when the user utilizes a given device, the user may be provided with access to the most recent user inputs.

Figure 6A:
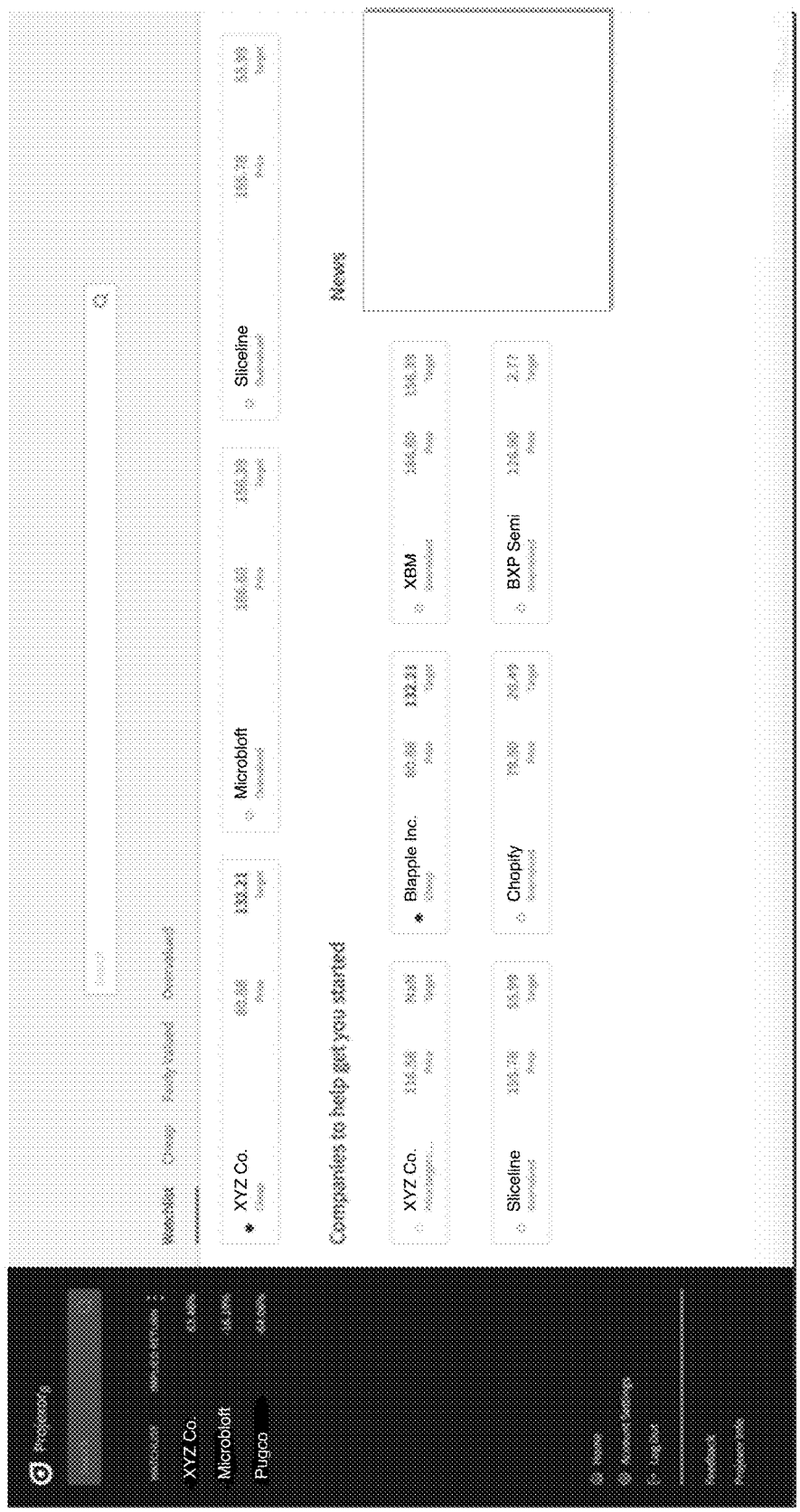

FIG. 6A illustrates an example model target selection user interface. The model target selection user interface includes a variety of targets for which predictions may be provided. A top row includes subjects (e.g., companies) on the user's watch list presented in association with current related data and current or last model predictions (e.g., current stock price, target/predicted stock price, and value classification (e.g., underpriced, overprices, fairly priced). The watch list may be populated by one or more remote systems (e.g., system 114A). In addition, the remote system may populate the user interface with recommendations of prediction subjects. The recommendations can be generated using the user's profile (e.g., as similarly discussed above), based on current activity by other users (e.g., subjects for which large or trending numbers of users are providing recommendations), based on prediction requests from third parties, or otherwise. The recommended subjects may be presented in association with related information (e.g., current stock price, predicted stock price by other users, predicted stock price using default model values). In addition, a news panel may be populated with news related to one or more of the subjects.

Figure 6B:
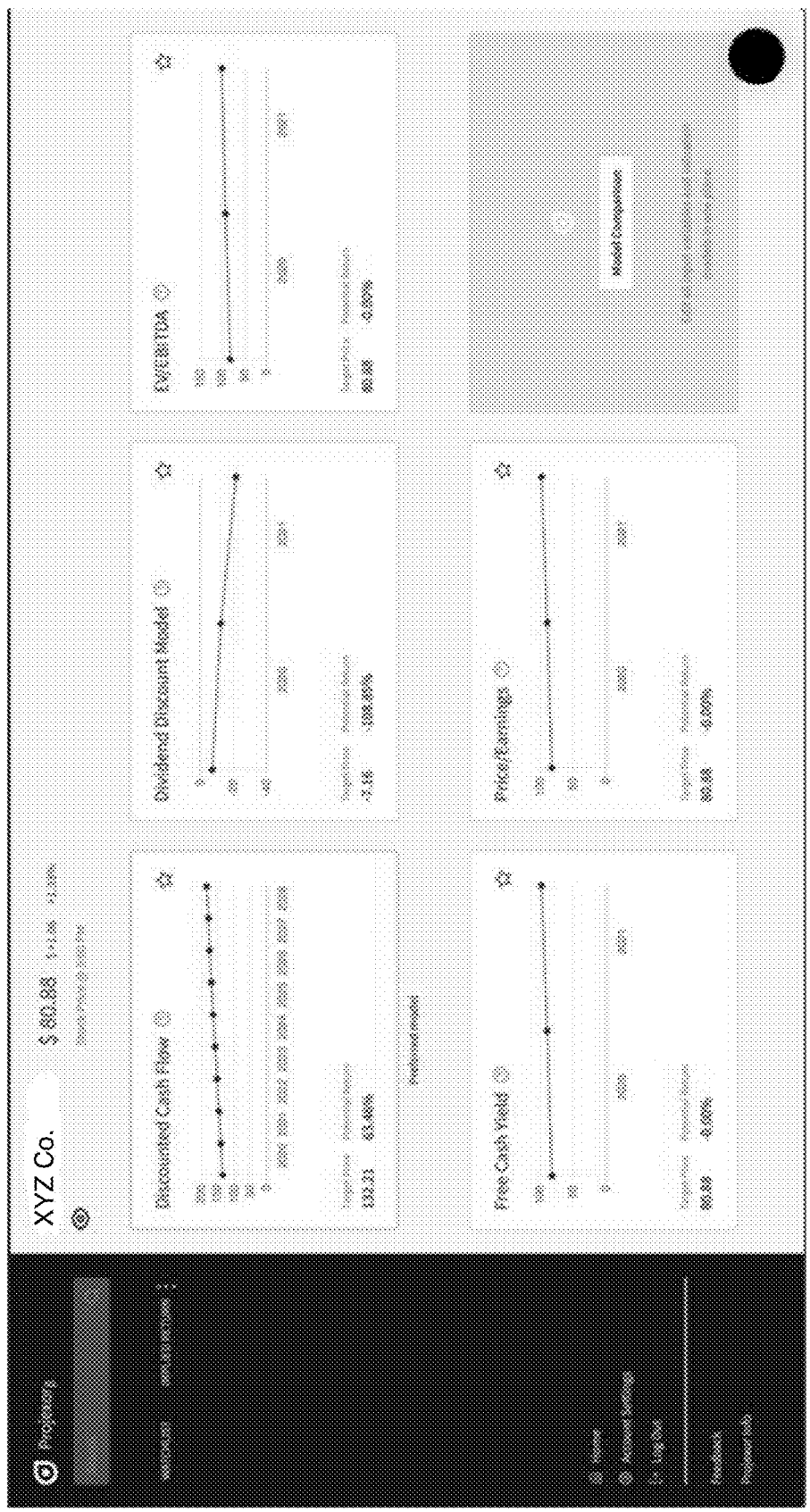

FIG. 6B illustrates an example user interface that enables a user to select a prediction model from a plurality of different prediction models. For example, in response to the user selecting a subject via FIG. 6A, the example user interface may be presented, providing relevant available prediction models. In this example, in addition to the available models, subject-related data is presented (e.g., current stock price, the current days dollar change and percentage change in stock price, etc.). The example models may be presented in association with graphed historical information and certain predicted values (e.g., target price, potential returns, etc.). A preferred model may be identified. The preferred model may be identified based on a previous preferred model designation provided by the user (e.g., by selecting a preferred star interface), based on the popularity of the model (as measured by usage or preferred model designations of other users), and/or based on the performance of the model (e.g., a determination that in a specified time period the model has generated the most accurate prediction). In the illustrated example, the models include discounted cash flow, dividend discount, EV/EBITDA, free cash yield, and price/earnings models. A control is provided via which the user can select a model comparison function (which enables the user view a comparison of model outputs and to edit all input variables and models in one place).

Figures 1, 6C:
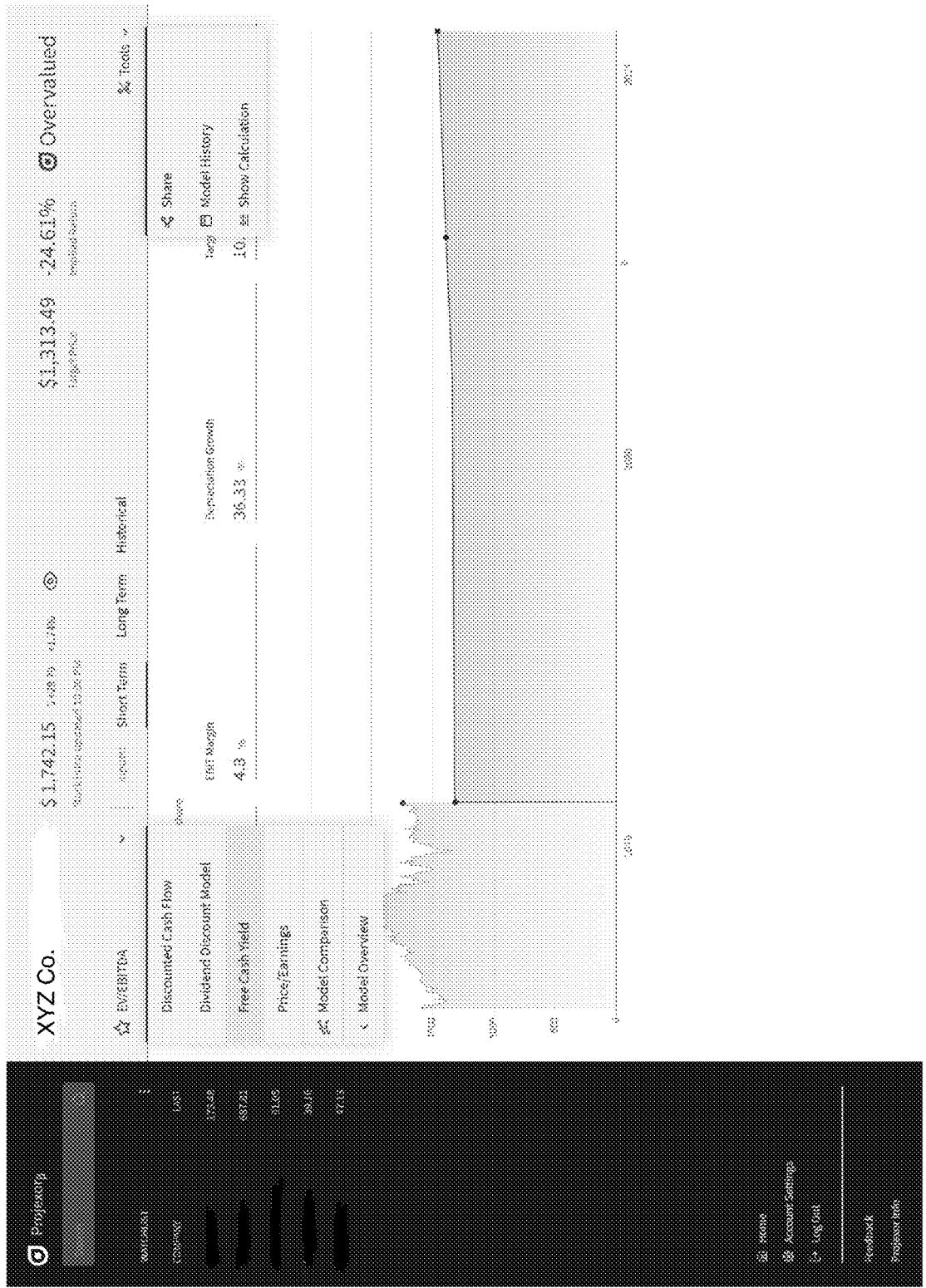
Figures 2, 6C:
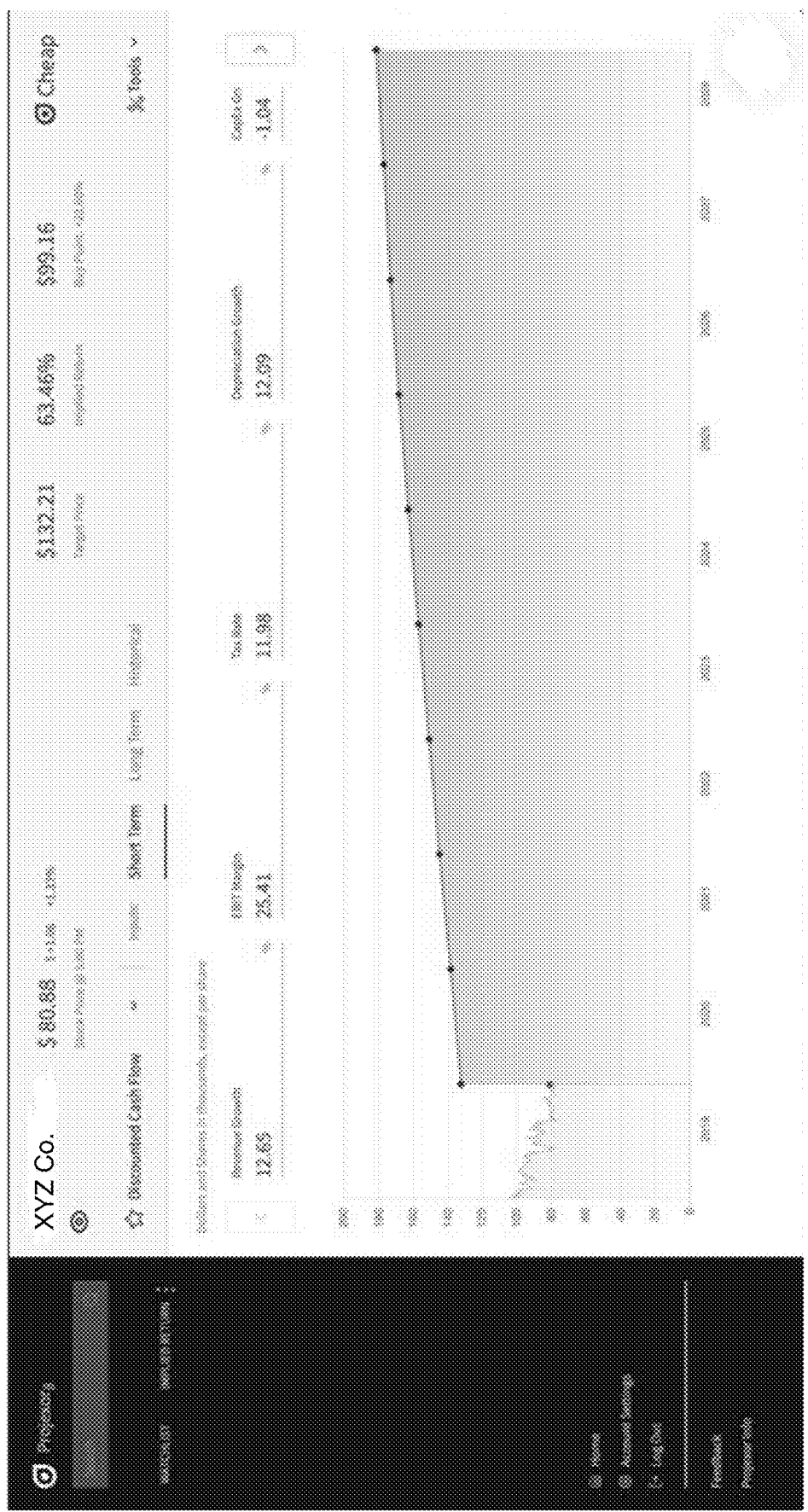

FIG. 6C illustrates an example user interface. The example user interface enables the user to select what data/predictions are to be presented. For example, a user can select from discounted cash flow, dividend discount model, free cash flow yield, price/earnings, model comparison, and model overview.

Discounted cash flow (DCF) provides a valuation method that may be used to estimate the value of an investment based on future cash flows. DCF analysis determines the present value of expected future cash flows using a discount rate. A present value estimate may then be used to evaluate a potential investment. If the value calculated using the DCF is higher than the current cost of the investment, the investment opportunity may be beneficial. DCF may be calculated using the following formula.

$$DCF = CF_1/(1+r)^1 + CF_2/(1+r)^2 + CF_3/(1+r)^3 + \ldots CFn/(1+r)^n$$

where CF=cash flow, and r=discount rate.

The dividend discount model (DDM) may be used to predict the price of a company's stock, where the current stock price may reflect the sum of all of future dividend payments from the stock, when discounted back to their present value. Thus, the DDM may be used in calculating an estimated fair value of a stock based on the dividend payout factors and the market expected returns. If the value obtained from the DDM is higher than the current trading price of shares, then the stock may be classified as undervalued or "cheap" (and so a purchase of the stock should be considered), and if the value obtained from the DDM is lower than the current trading price of shares, then the stock may be classified as overvalued (and so a purchase of the stock should be disfavored, and if the stock is currently being held, sale of the stock should be considered).

Free cash flow yield is a financial solvency ratio that compares the free cash flow per share a company is expected to earn against the current market value per share. Free cash flow yield may be calculated as follows:

Free cash flow yield=free cash flow per share/current share price

The lower the free cash flow yield, the less advantageous the investment may be, as the return on investment is relatively lower. By contrast, the higher the free cash flow yield the more advantageous the investment may be, as the return on investment is relatively higher and the company is generating more cash to satisfy company debts and other obligations.

The price-to-earnings ratio (P/E ratio) measures a company's current share price relative to its per-share earnings (EPS). The P/E ratio provided an indication as to the relative value of a company's shares. The P/E ratio of one company can be compared against that of other companies to determine its relative value.

In the example illustrated in FIG. 6C, the user has selected Free Cash Yield and a short term period.

Figure 6D:
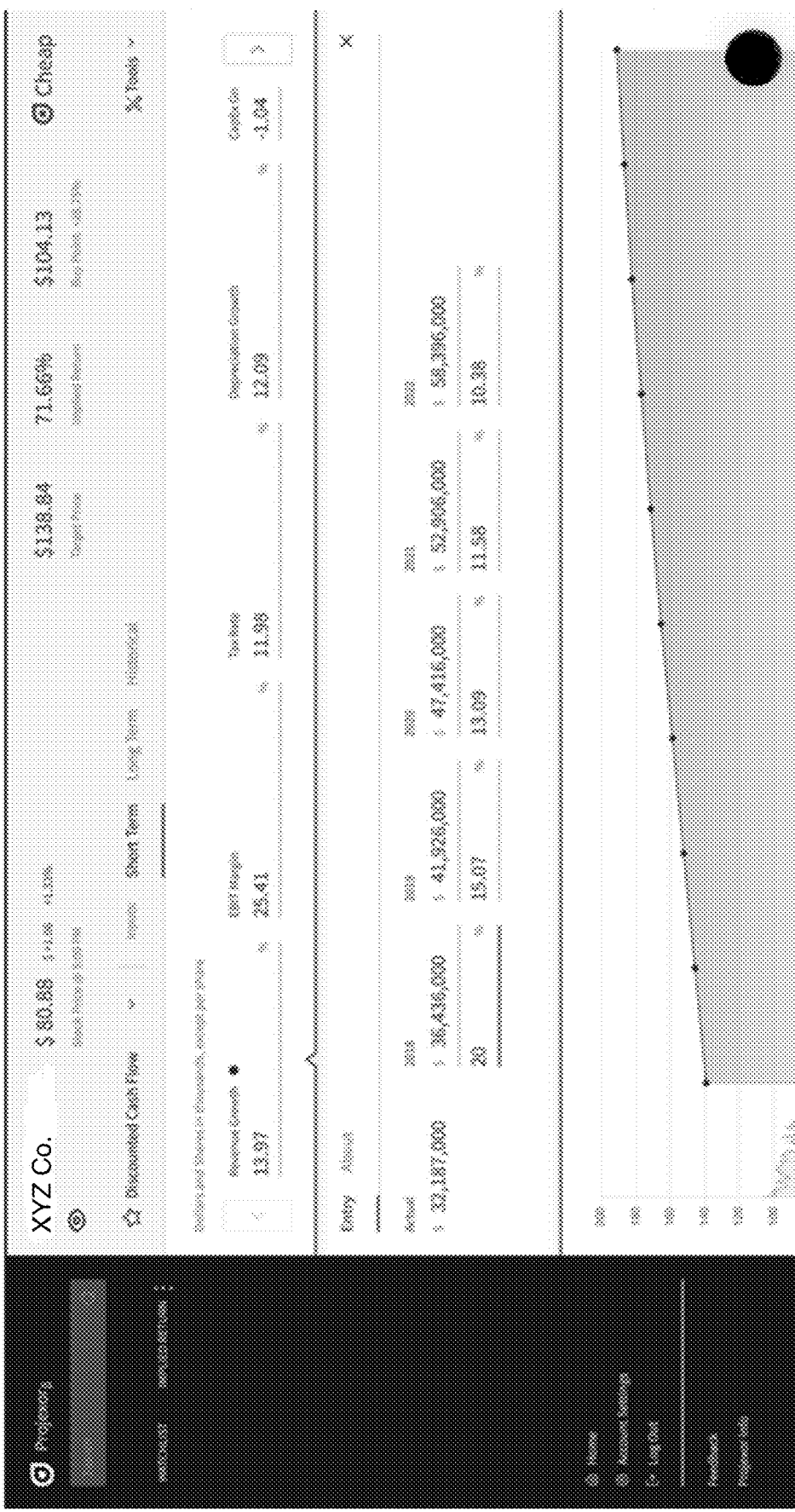

Referring to FIG. 6D-1, 6D-2 (where FIG. 6D-2 illustrates the user interface of FIG. 6D-1 with the revenue growth window pane opened), the user interface renders the current baseline revenue growth, the EBIT margin, the depreciation growth, and the target EV/EBITDA. In this example, the user has selected short term inputs control for the foregoing values. A long term inputs control is provided which when selected will cause long term data to be used for the foregoing values.

Default model values may be generated for a given model input using linear extrapolation. For example, the previous 3 years (or other time period) of values may be used to generate a liner extrapolated value corresponding to a predicted future value. As described herein, the user may modify these default values (e.g., based on the user's informed intuition or analysis) for execution by the corresponding model. For example, the user interface may enable the user to modify a value by typing a new value, by specifying a percentage change, by specifying a year for which the change is to be made, by specifying that the change should be made to all years for which predictions are being made, etc. Optionally, change-up/change-down controls are provided which when activated cause the corresponding model input value to be changed by a set amount (e.g., 0.1 per change control activation). In response, the model output may be rendered in real time for each change, thereby enabling the user to view the model's sensitivity to changes in the input values.

Figure 6E:
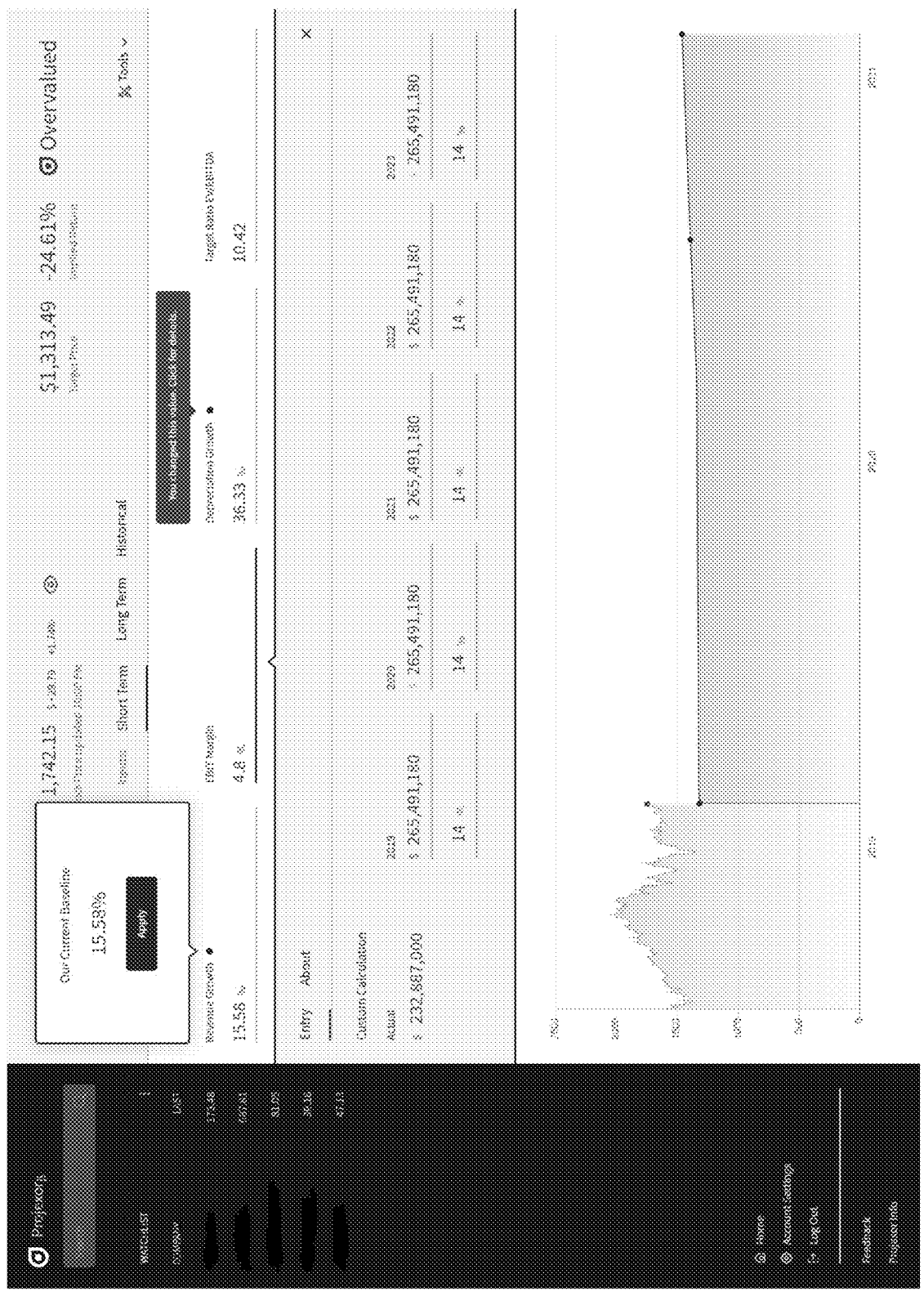

In this example, a user change to the depreciation growth default value is detected, and a notification (e.g., text and a colored dot) is provided indicating that the user has changed the depreciation growth value as illustrated in FIG. 6E. A link is provided via the notification, which, when activated by the user, will cause additional details to be accessed and rendered.

In this example, the user has selected the EBIT margin value. In response, the user interface has accessed and rendered model calculations for various time periods/years (2019, 2020, 2021, 2022, 2023).

A graph is generated and rendered displaying the actual and model prediction value for respective EBIT margin values.

In addition, a current stock price, a target stock price, an implied return (the percentage difference between the current stock price and target stock price), and a valuation classification (e.g., undervalued, overvalued, appropriately valued) may be determined and rendered. For example, if the model generates a current stock value that is greater than the actual current stock value by a threshold percentage, the stock may be considered undervalued. If the model generates a current stock value that is less than the actual current stock value by a threshold percentage, the stock may be considered overvalued. If the model generates a current stock value that is within a percentage range of the actual current stock value (e.g., +/−3%) the stock may be considered properly valued.

The user interface efficiently renders data using alphanumeric text and graphical data to better provide large amounts of data in a relatively small user interface.

Figure 6F:
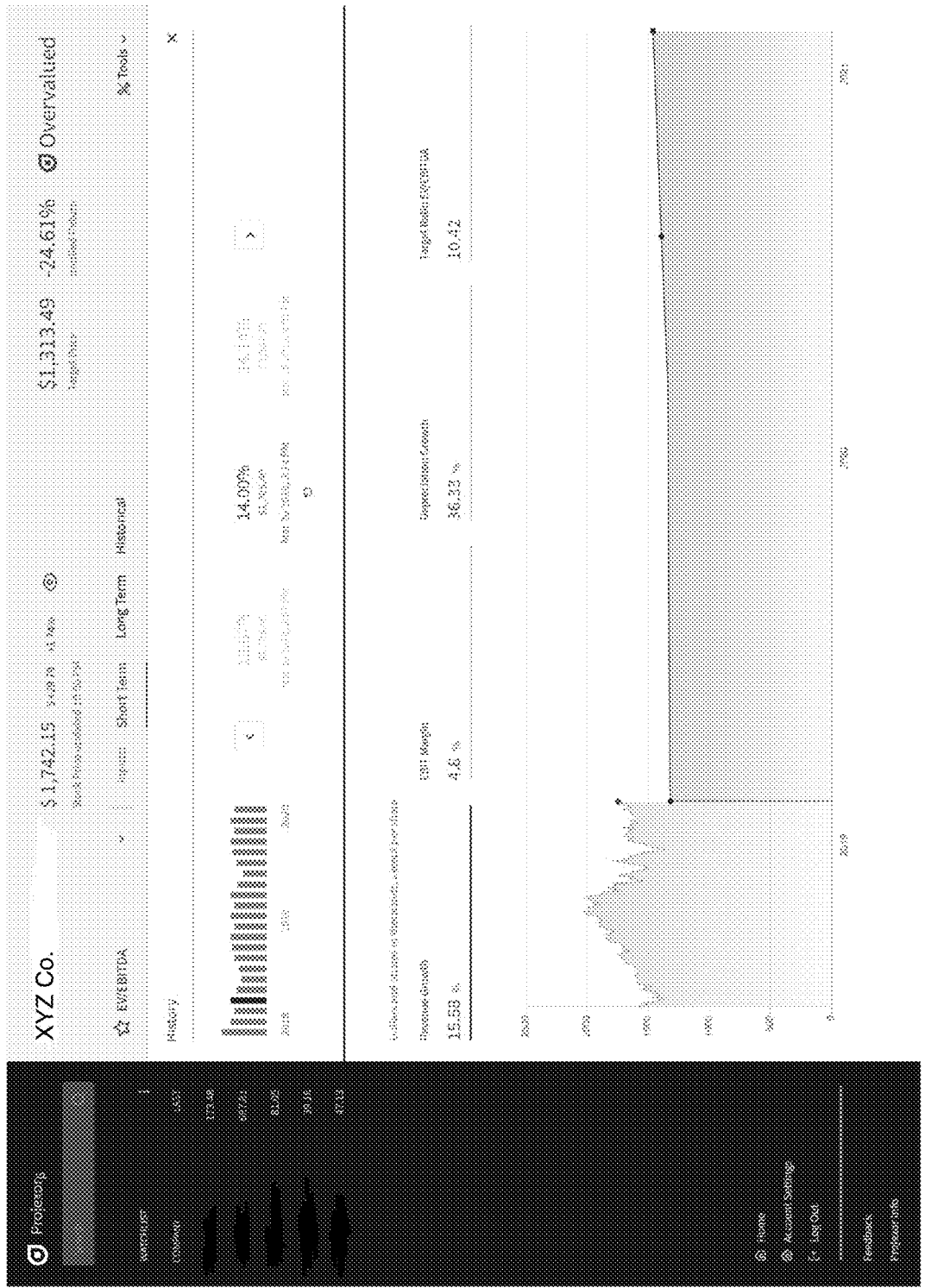

Referring to FIG. 6F, the rendered user interface provides additional representations of data using short term data sets as model inputs. Historical prediction data is provided for EV/EBITDA data using a bar graph (or other graph type) and using text (where the text includes percentage data, dollar amount data, date data, and time data). The prediction data may correspond to predictions made using various versions of input/assumption data specified by the user. In this example, the graph illustrates predicted target values. Scroll controls are provided enabling a user to scroll backwards and forwards through historical predicted data (e.g., via a carousel user interface). The user may select a given historical prediction value and corresponding model parameters may be presented (e.g., the model inputs used to generate the predictions). The user may modify and save the parameters as a new model, and may cause the new model to be executed. Optionally, the user may be enabled to add descriptive text and/or graphics to the model or to a particular model input value for later access of the model.

In addition, revenue growth, EBIT margin, depreciation growth, and target ration EV/EBITDA values are rendered. In this example, the user has selected revenue growth data, and in response, a corresponding graph is generated and rendered showing historical and model-generated revenue growth data.

Figure 6G:

FIG. 6G illustrates an example model comparison user interface. As similarly discussed elsewhere herein, each version of a given model's parameters modified by the user and/or and prediction values (and date/time) may be stored in association with a user identifier. Such stored values may be used to populate the model comparison user interface and may be used in generating a graph showing the change in prediction accuracy and/or change in predicted values for various versions of the modifications to the model or model inputs/assumptions made by the user.

In addition, in this example the user interface is populated with model outputs for the target price, implied return (the percentage difference between the current actual price and the target, predicted price), and the valuation classification for the discounted cash flow, dividend discount model, EV/EBITDA, and free cash yield. Optionally, where certain values are not applicable or available for a given model, the user interface may be populated by text and/or a symbol so indicating (e.g., "price target cannot be calculated").

Optionally, the user interface enables a user to edit input variables of each compared model.

Figure 6H:
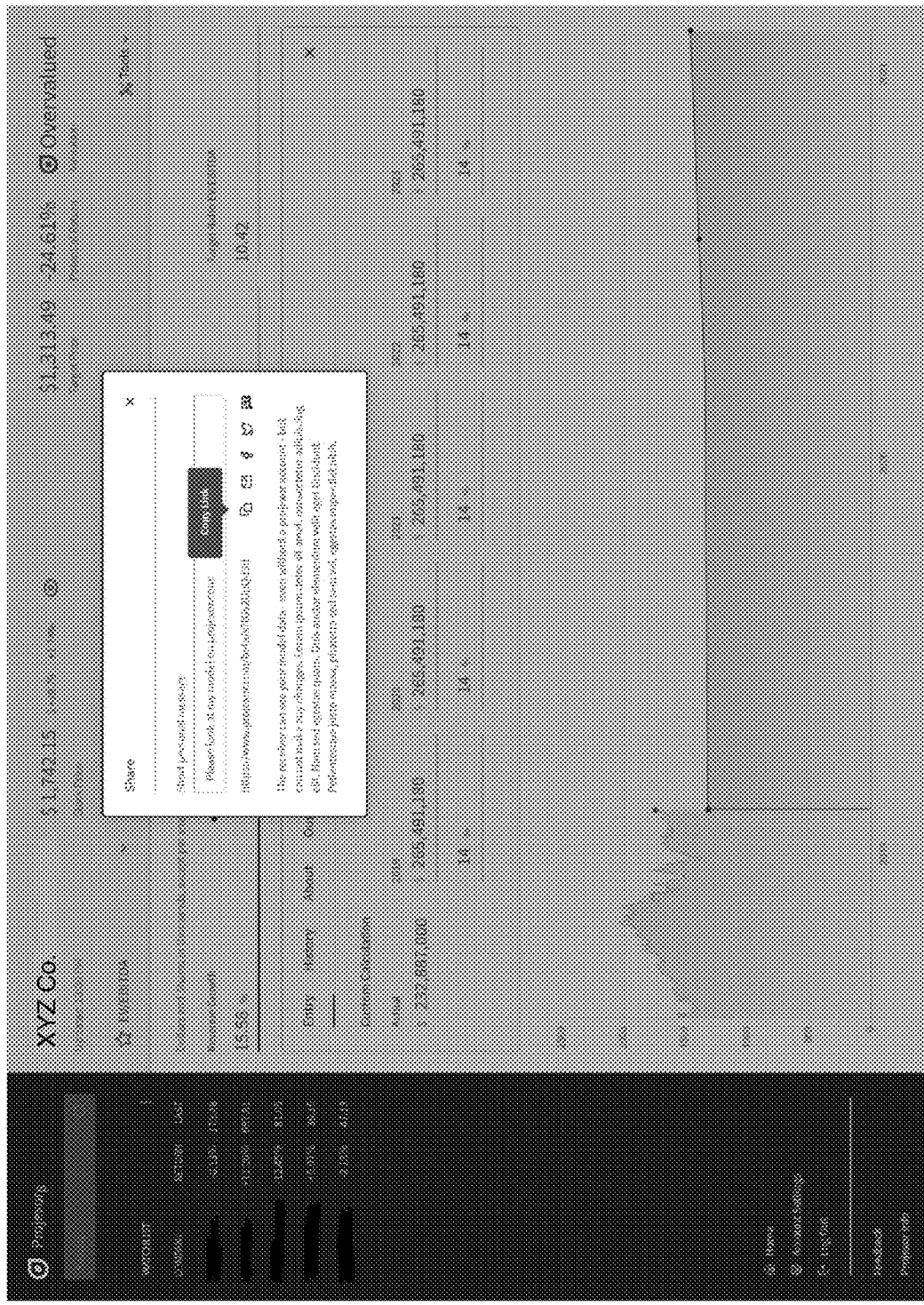
Figure 6I:
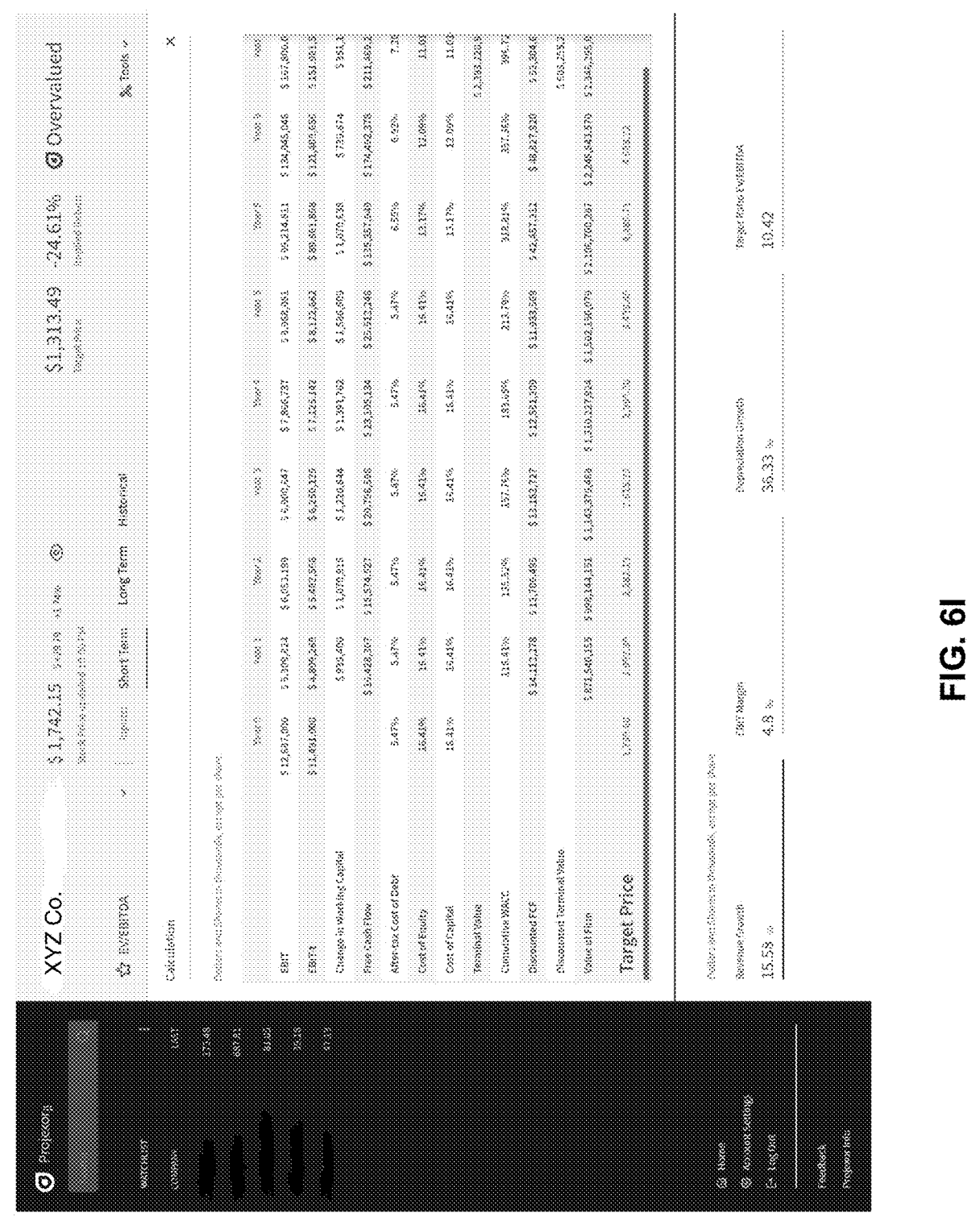

FIG. 6H illustrates an example sharing user interface that enables a user to share a model and/or model parameters with one or more destinations. A field is provided via which a user may add text to be transmitted in association with a link to the model and/or model parameters. The user interface illustrates various sharing mechanisms that the user may select to share the model and/or model parameters. For example, the user may select a copy link, email, social network, microblog, or other sharing control, and the model and/or model parameters may be accordingly shared. The system 114A may track which models were shared, how many times the model was shared, when the model was shared, FIG. 6I illustrates an example table generated and rendered that provides, in tabular format, various calculated data for several time periods (e.g., multiple years), such as EBIT, EBIT-t, Change in Working Capital, Free Cash Flow, After-tax Cost of debt, Cost of Equity, Cost of Capital, Terminal Value, Cumulative WACC, Discounted FCF, Discounted Terminal Value, Value of Firm, and Target Price. In addition, revenue growth, EBIT margin, depreciation growth, and target ratio EV/EBITDA data is generated and rendered. Optionally, in response to the user selecting a given value, the corresponding model parameters used to generate the value may be accessed and rendered.

Figure 6J:
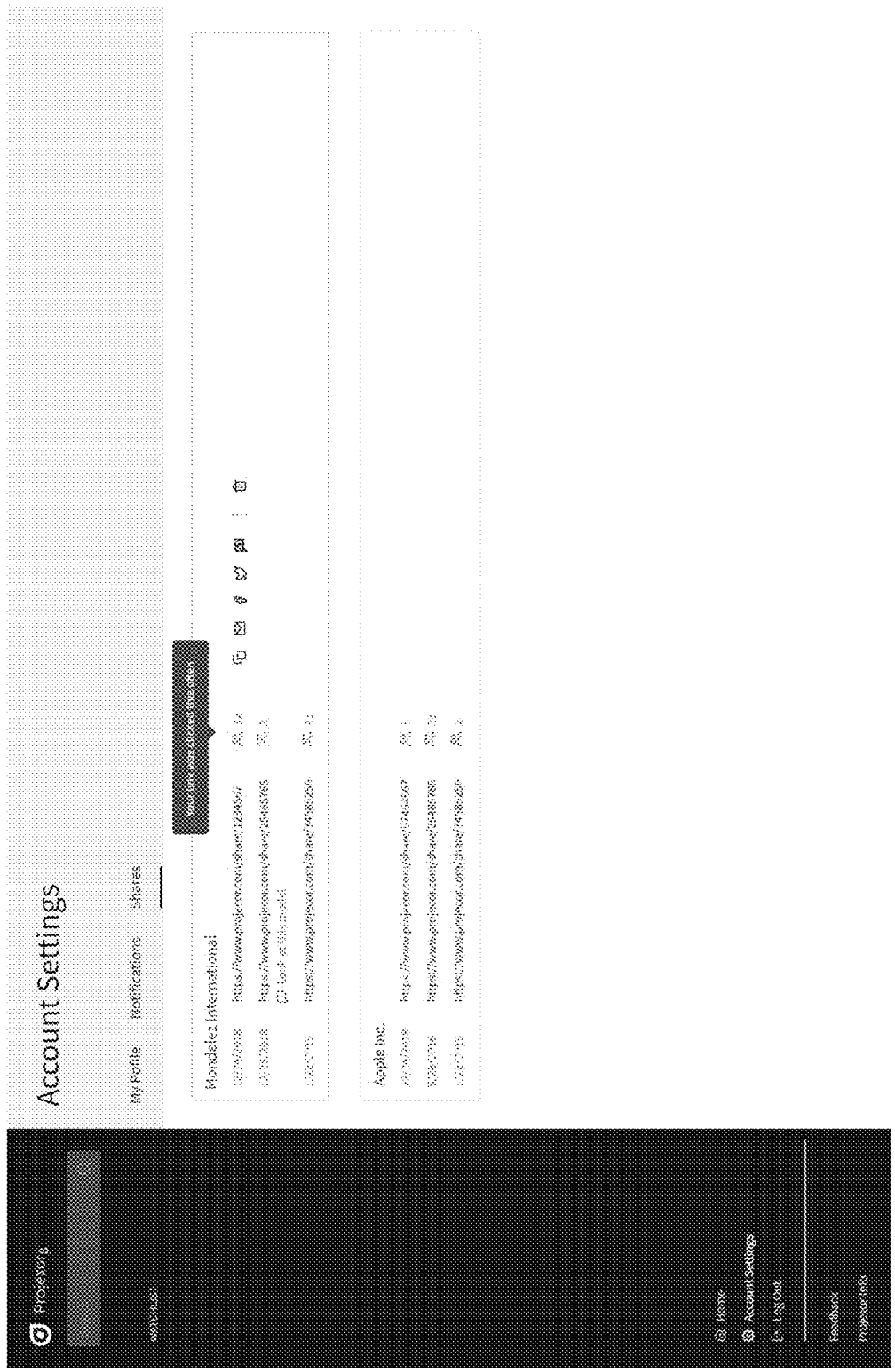

FIG. 6J illustrates an example account settings user interface. In this example, for each prediction target (identified by name), model links are provided for models modified by the user (e.g., the user modified model inputs), including the modification date. In addition, the number of times the user's model has been accessed (e.g., by clicking on a model link) may be tracked. In addition, the number of times a given model was shared via a given sharing mechanism (e.g., copy of the model link, email, social networking platform, microblog, etc.).

Thus, described herein are methods and systems configured to distribute model execution to disparate systems. Further, the models may be modified via the disparate systems. Higher performing prediction sources may be identified and corresponding communication groups generated to further enhance the ability of the disparate systems to generate predictions. Computer system resources may be allocated so as to reduce resource allocations to systems providing lower accuracy predictions.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers, gaming consoles, smart televisions, etc. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integer to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. For example, a click may be in the form of a user touch (via finger or stylus) on a touch screen, or in the form of a user moving a cursor (using a mouse of keyboard navigation keys) to a displayed object and activating a physical control (e.g., a mouse button or keyboard key). User inputs may, by way of example, be provided via an interface or in response to a prompt (e.g., a voice or text prompt). By way of example an interface may include text fields, wherein a user provides input by entering text into the field. By way of further example, a user input may be received via a menu selection (e.g., a drop down menu, a list or other arrangement via which the user can check via a check box or otherwise make a selection or selections, a group of individually selectable icons, a menu selection made via an interactive voice response system, etc.). When the user provides an input or activates a control, a corresponding computing system may perform a corresponding operation (e.g., store the user input, process the user input, provide a response to the user input, etc.). Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone, a VoIP equipped mobile device, etc.), laptop, tablet computer, interactive television, game console, media streaming device, head-wearable display, virtual reality display/headset, augmented reality display/headset, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

What is claimed is:

1. A system, comprising:
   a processing device;
   a network interface; and
   a computer readable medium that stores programmatic instructions that, when executed by the processing device, are configured to cause the system to perform operations comprising:
   generate prediction subject recommendations, including a first prediction subject recommendation, for a first plurality of users, wherein a given prediction subject recommendation subject relates to a corresponding company;
   receive a selection of the first prediction subject from a plurality of users in the first plurality of users;
   generate default input values for a first prediction model corresponding to the first prediction subject, the default input values generated using historical financial data for at least one of revenue growth, EBIT (Earnings Before Interest and Taxes), margin, depreciation growth, or target EV (Enterprise Value)/EBITDA (Earnings Before Interest, Taxes, Depreciation & Amortization);
   transmit, using the network interface, to disparate, distributed user systems associated with respective users in the plurality of users, first prediction model program code for the first prediction model corresponding to the first prediction subject, the first prediction model program code for the first prediction model configured to be executed by the disparate, distributed user systems;
   provide access to the disparate, distributed user systems to an interactive model data specification user interface populated with one or more of the default input values generated using historical financial data for at least one of revenue growth, EBIT margin, depreciation growth, or target EV/EBITDA used as default inputs to the first prediction model;
   enable users in the first plurality of users to modify the one or more of the default input values generated using historical financial data for at least one of revenue growth, EBIT margin, depreciation growth, or target EV/EBITDA via the interactive model data specification user interface to provide modified input values including at least one modified revenue growth, EBIT margin, depreciation growth, or target EV/EBITDA value;
   enable the first prediction model program code to be executed by user systems in the disparate, distributed user systems to generate respective model prediction values using respective one or more modified input values as inputs to the first prediction model;
   receive a first plurality of model prediction values from at least a portion of the disparate, distributed user systems generated by the first prediction model using respective one or more modified input values;
   analyze the received first plurality of model prediction values;
   generate respective accuracy scores for the received first plurality of model prediction values using the analysis of the received model prediction values;
   determine, using the generated accuracy scores for the analyzed accuracy of the received first plurality of model prediction values from disparate, distributed user systems, which prediction values, made using input values modified by respective users, satisfy at least a first criterion, the at least first criterion comprising:
   satisfaction of a first score threshold, and/or
   satisfaction of a ranking level;
   define a first communication group including a subset of the users in the first plurality of users using the determination as to which prediction values, made using input values modified by respective users, satisfy the at least first criterion, wherein the subset of users in the defined first communication group are enabled to communicate with each other using a first communication mechanism,
   prevent at least a first user using a first user system from communicating with the first communication group based at least in part on the determination that model prediction values associated with the first user fail to satisfy the at least first criterion; and
   redefining the first communication group to create a modified first communication group using accuracy scores generated for a second plurality of model prediction values.

2. The system as defined in claim 1, wherein the first prediction model program code is configured to be executed using respective browsers hosted on the disparate, distributed user systems.

3. The system as defined in claim 1, wherein the first communication group is enabled to generate a group consensus forecast.

4. The system as defined in claim 1, wherein the operations further comprise:
   enabling the first communication to exchange forecast information.

5. The system as defined in claim 1, wherein the operations further comprise:
   crawl one or more remote computer resources for actual data to be used in generating respective accuracy scores for the received model prediction values.

6. The system as defined in claim 1, wherein the operations further comprise:
   select metrics to be used in generating respective accuracy scores for the received model prediction values based at least in part on a model type.

7. The system as defined in claim 1, wherein the operations further comprise:
   generate an aggregated prediction using a plurality of the received model prediction values from the disparate, distributed user systems.

8. The system as defined in claim 1, wherein the operations further comprise:
   generate prediction subject recommendations for a given user based at least in part on data related to a profile of the given user, wherein the prediction subject recommendations comprise subjects for which the given user can generate predictions using corresponding prediction models; and
   transmit the prediction subject recommendations to the given user.

9. The system as defined in claim 1, wherein the operations further comprise:
   enable a comparison of prediction values of the first prediction model and prediction values of a second prediction model to be rendered using graphical representations of predictions from the first prediction model and the second prediction model.

10. The system as defined in claim 1, wherein the model parameters received from disparate, distributed user systems comprise model input data, including one or more modified input values different than the default input values.

11. The system as defined in claim 1, wherein the operations further comprise:
synchronize a prediction subject watch list defined by a user over a network across a plurality of devices associated with the user.

12. Non-transitory computer readable medium that stores programmatic instructions that, when executed by a processing device, are configured to cause the processing device to perform operations comprising:
generate prediction subject recommendations, including a first prediction subject recommendation, for a first plurality of users;
receive a selection of the first prediction subject from a plurality of users in the first plurality of users;
generate default input values for a first prediction model corresponding to the first prediction subject, the default input values generated using historical financial data for at least one of revenue growth, EBIT (Earnings Before Interest and Taxes), margin, depreciation growth, or target EV (Enterprise Value)/EBITDA (Earnings Before Interest, Taxes, Depreciation & Amortization);
transmit, using a network interface, to a plurality of remote user systems, first prediction model program code for the first prediction model corresponding to the first prediction subject, the first prediction model program code configured to be respectively executed by the plurality of remote user systems;
provide access to the plurality of remote user systems to an interactive model data specification user interface populated with one or more of the default input values generated using historical financial data for at least one of revenue growth, EBIT margin, depreciation growth, or target EV/EBITDA used as default inputs to the first prediction model;
enable users to modify the one or more of the default input values generated using historical financial data for at least one of revenue growth, EBIT margin, depreciation growth, or target EV/EBITDA via the interactive model data specification user interface to provide modified input values including at least one modified revenue growth, EBIT margin, depreciation growth, or target EV/EBITDA value;
enable the first prediction model program code to be executed by user systems in the plurality of remote user systems to generate respective model prediction values using respective one or more user modified input values as inputs to the first prediction model;
receive a first plurality of model prediction values from the user systems generated by the first prediction model using respective one or more user modified input values;
analyze the received first plurality of model prediction values;
generate respective accuracy scores for the received first plurality of model prediction values using the analysis of the received model prediction values;
determine, using the generated accuracy scores for the analyzed received first plurality of model prediction values, which model prediction values, made using input values modified by respective users, satisfy at least a first criterion, the at least first criterion comprising:
satisfaction of a first score threshold, and/or
satisfaction of a ranking level;
define a first subset of the users in the first plurality of users using the determination as to which prediction values, made using input values modified by respective users, satisfy the at least first criterion, wherein the subset of users in the defined first subset of the users are enabled to access a first resource, the first resource comprising a communication resource or a program resource;
inhibit at least a first user from accessing the first resource based at least in part on the determination that one or more model prediction values associated with the first user fail to satisfy the at least first criterion;
redefine the first subset of the users to create a modified first subset of the users using accuracy scores generated for a second plurality of model prediction values.

13. The non-transitory computer readable medium as defined in claim 12, wherein the prediction model program code is configured to be executed using respective browsers hosted on the plurality of remote user systems.

14. The non-transitory computer readable medium as defined in claim 12, wherein the first resource comprises a text communication resource.

15. The non-transitory computer readable medium as defined in claim 12, wherein the operations further comprise:
define a communication group including the first subset of users; and
enable the defined first communication group to communicate with each other using a first communication mechanism,
wherein the first user is inhibited from communicating with the first communication group based at least in part on the determination that one or more model prediction values associated with the first user fail to satisfy the at least first criterion.

16. The non-transitory computer readable medium as defined in claim 12, wherein the operations further comprise:
crawl one or more remote computer resources for actual data to be used in generating respective accuracy scores for the received model prediction values.

17. The non-transitory computer readable medium as defined in claim 12, wherein the operations further comprise:
select metrics to be used generating respective accuracy scores for the received model prediction values based at least in part on a model type.

18. The non-transitory computer readable medium as defined in claim 12, wherein the operations further comprise:
generate an aggregated prediction using a plurality of the received model prediction values from the plurality of remote user systems.

19. The non-transitory computer readable medium as defined in claim 12, wherein the operations further comprise:
generate prediction subject recommendations for a given user based at least in part on data related to a profile of the given user, wherein the prediction subject recommendations comprise subjects for which the given user can generate predictions using corresponding prediction models; and
transmit the prediction subject recommendations to the given user.

20. The non-transitory computer readable medium as defined in claim 12, wherein the operations further comprise:

enable a comparison of prediction values of the first prediction model and prediction values of a second prediction model to be rendered using graphical representations of predictions from the first prediction model and the second prediction model.

21. The non-transitory computer readable medium as defined in claim 12, wherein the operations further comprise:

synchronize a prediction subject watch list defined by a user over a network across a plurality of devices associated with the user.

22. A computer implemented method, the method comprising:

generating prediction subject recommendations, including a first prediction subject recommendation, for a first plurality of users;

receiving a selection of the first prediction subject from a plurality of users in the first plurality of users;

generating default input values for a first prediction model corresponding to the first prediction subject, the default input values generated using historical financial data for at least one of revenue growth, EBIT (Earnings Before Interest and Taxes), margin, depreciation growth, or target EV (Enterprise Value)/EBITDA (Earnings Before Interest, Taxes, Depreciation & Amortization);

providing access to, using a network interface, a plurality of remote user systems associated with respective users, to the first prediction model;

providing access to the plurality of remote user systems to an interactive model data specification user interface populated with one or more of the default input values generated using historical financial data for at least one of revenue growth, EBIT margin, depreciation growth, or target EV/EBITDA used as default inputs to the first prediction model;

enabling users to modify the one or more of the default input values generated using historical financial data for at least one of revenue growth, EBIT margin, depreciation growth, or target EV/EBITDA via the interactive model data specification user interface to provide modified input values including at least one modified revenue growth, EBIT margin, depreciation growth, or target EV/EBITDA value;

enabling the first prediction model to be executed by user systems in the plurality of remote user systems to generate respective model prediction values using respective one or more user modified input values as inputs to the first prediction model;

receiving a first plurality of prediction values from the user systems generated by the first prediction model using respective one or more user modified input values;

analyzing the received first plurality of model prediction values;

generating respective accuracy scores for the received first plurality of model prediction values using the analysis of the received model prediction values;

determining, using the generated accuracy scores for the analyzed received first plurality of model prediction values, which model prediction values, made using input values modified by respective users, satisfy at least a first criterion, the at least first criterion comprising:

satisfaction of a first score threshold, and/or
satisfaction of a ranking level;

defining a first subset of the users in the first plurality of users using the determination as to which prediction values, made using input values modified by respective users, satisfy the at least first criterion, wherein the subset of users in the defined first subset of the users are enabled to access a first resource, the first resource comprising a communication resource or a program resource;

inhibiting at least a first user from accessing the first resource based at least in part on the determination that one or more model prediction values associated with the first user fail to satisfy the at least first criterion; and redefining the first subset of the users to create a modified first subset of the users using accuracy scores generated for a second plurality of model prediction values.

23. The computer implemented method as defined in claim 22, wherein the prediction model program code is configured to be executed using respective browsers hosted on the plurality of remote user systems.

24. The computer implemented method as defined in claim 22, wherein the first resource comprises a communication resource.

25. The computer implemented method as defined in claim 22, the method further comprising:

defining a communication group among the respective users of the remote user systems regarding a first prediction subject based at least in part on the generated accuracy scores.

26. The computer implemented method as defined in claim 22, the method further comprising:

crawling one or more remote computer resources for actual data to be used in generating respective accuracy scores for the received model prediction values.

27. The computer implemented method as defined in claim 22, the method further comprising:

selecting metrics to be used generating respective accuracy scores for the received model prediction values.

28. The computer implemented method as defined in claim 22, the method further comprising:

generating an aggregated prediction using a plurality of the received model prediction values.

29. The computer implemented method as defined in claim 22, the method further comprising:

generating prediction subject recommendations for a given user based at least in part on data related to a profile of the given user, wherein the prediction subject recommendations comprise subjects for which the given user can generate predictions using corresponding prediction models; and transmit the prediction subject recommendations to the given user.

30. The computer implemented method as defined in claim 22, the method further comprising:

enabling a comparison of prediction values of the first prediction model and prediction values of a second prediction model to be rendered using graphical representations of predictions from the first prediction model and the second prediction model.

* * * * *